US012697580B2

(12) United States Patent
Calabro et al.

(10) Patent No.: US 12,697,580 B2
(45) Date of Patent: Aug. 4, 2026

(54) OXYGEN-ENRICHED COMBUSTION FOR NATURAL GAS COMBINED CYCLE OPERATION

(71) Applicant: EXXONMOBIL TECHNOLOGY AND ENGINEERING COMPANY, Annandale, NJ (US)

(72) Inventors: David C. Calabro, Bridgewater, NJ (US); Edward W. Corcoran, Jr., Nazareth, PA (US); Neel Rangnekar, Whitehouse Station, NJ (US); Yu Wang, Lebanon, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 269 days.

(21) Appl. No.: 18/349,471

(22) Filed: Jul. 10, 2023

(65) Prior Publication Data

US 2024/0017204 A1 Jan. 18, 2024

Related U.S. Application Data

(60) Provisional application No. 63/388,510, filed on Jul. 12, 2022.

(51) Int. Cl.
*B01D 53/22* (2006.01)
*B01D 53/047* (2006.01)
(Continued)

(52) U.S. Cl.
CPC ........... *B01D 53/047* (2013.01); *B01D 53/62* (2013.01); *B01D 53/92* (2013.01);
(Continued)

(58) Field of Classification Search
CPC ...... B01D 53/047; B01D 53/62; B01D 53/92; B01D 2256/10; B01D 2256/12;
(Continued)

(56) References Cited

U.S. PATENT DOCUMENTS 4,985,231 A * 1/1991 Lywood ................... B01J 8/062
                                                    423/652
5,175,061 A * 12/1992 Hildebrandt ........ H01M 8/0612
                                                    429/408

(Continued)

FOREIGN PATENT DOCUMENTS

CN 101318634 A 12/2008
DE 3933441 A1 4/1991
(Continued)

OTHER PUBLICATIONS

National Oceanic and Atmospheric Administration. 1 page. (Jul. 2, 2024). The Atmosphere. https://www.noaa.gov/jetstream/ atmosphere (Year: 2024).*

(Continued)

*Primary Examiner* — Anthony Shumate
(74) *Attorney, Agent, or Firm* — Shook, Hardy & Bacon L.L.P.

(57) ABSTRACT

Systems and methods are provided for operating a combined cycle power plant while enhancing the $CO_2$ content of the flue gas generated by the power plant. The $CO_2$ content is enhanced by using a combination of exhaust gas recycle and oxygen-enriched combustion. The oxygen-containing flow for performing the oxygen-enriched combustion can be generated by an integrated pressure swing adsorption process that allows for production of a commercial grade nitrogen stream (95 vol % or more of $N_2$) while also (Continued)

providing an oxygen-containing stream with an oxygen content between 25 vol % and 48 vol % with high $O_2$ recovery.

20 Claims, 7 Drawing Sheets

(51) Int. Cl.

| | |
|---|---|
| *B01D 53/62* | (2006.01) |
| *B01D 53/92* | (2006.01) |
| *H01M 8/04089* | (2016.01) |
| *H01M 8/14* | (2006.01) |

(52) U.S. Cl.

CPC ......... *H01M 8/04097* (2013.01); *H01M 8/14* (2013.01); *B01D 2256/10* (2013.01); *B01D 2256/12* (2013.01); *B01D 2257/504* (2013.01); *B01D 2259/40035* (2013.01); *B01D 2259/4005* (2013.01); *B01D 2259/402* (2013.01); *H01M 2008/147* (2013.01)

(58) Field of Classification Search

CPC .... B01D 2257/504; B01D 2259/40035; B01D 2259/4005; B01D 2259/402; H01M 8/04097; H01M 8/14; H01M 2008/147

See application file for complete search history.

(56) References Cited

U.S. PATENT DOCUMENTS

| | | | | |
|---|---|---|---|---|
| 5,447,557 | A | 9/1995 | Golden et al. | |
| 6,077,323 | A * | 6/2000 | Nataraj ................... | C01B 3/501 |
| | | | | 48/198.3 |
| 6,492,290 | B1 * | 12/2002 | Dyer ................... | C04B 35/2641 |
| | | | | 502/4 |
| 9,903,316 | B2 | 2/2018 | Gupta et al. | |
| 10,677,160 | B2 | 6/2020 | Sundaram et al. | |
| 2002/0023423 | A1 | 2/2002 | Viteri et al. | |
| 2007/0245855 | A1 * | 10/2007 | Zendejas-Martinez ...................... | |
| | | | | C21B 13/0086 |
| | | | | 75/496 |
| 2013/0118891 | A1 * | 5/2013 | Allam ................... | C10K 1/143 |
| | | | | 203/42 |
| 2013/0205746 | A1 * | 8/2013 | Allam ................... | C10K 1/024 |
| | | | | 60/39.12 |
| 2013/0333391 | A1 | 12/2013 | Sundaram et al. | |
| 2014/0302413 | A1 | 10/2014 | Berlowitz et al. | |
| 2015/0073188 | A1 * | 3/2015 | Floudas ................... | C10L 1/06 |
| | | | | 422/187 |
| 2016/0008753 | A1 | 1/2016 | Corcoran et al. | |
| 2017/0158504 | A1 * | 6/2017 | Merritt, Jr. ............... | C01B 3/48 |
| 2021/0031135 | A1 | 2/2021 | Coignet et al. | |
| 2022/0033722 | A1 * | 2/2022 | De Ren ............... | B01D 53/502 |
| 2023/0357003 | A1 * | 11/2023 | Skoulidas ................ | C01B 3/48 |
| 2024/0308847 | A1 * | 9/2024 | Barnett ............... | B01D 53/047 |

FOREIGN PATENT DOCUMENTS

| | | | |
|---|---|---|---|
| JP | 2015-522744 | A | 8/2015 |
| JP | 2017-519628 | A | 7/2017 |
| WO | 91/04788 | A1 | 4/1991 |

OTHER PUBLICATIONS

International Search Report and Written Opinion received for PCT Patent Application No. PCT/US2023/027255, mailed on Nov. 16, 2023, 223 pages.

Qinglin et al., "Revisiting Transport of Gases in the Micropores of Carbon Molecular Sieves", Langmuir, 2003, pp. 393-405, vol. 19.

Sircar et al., "Fractionation of Air by Zeolites", Stud Surf Sci Catalysis: Elsevier; 1999. pp. 395-423, vol. 120.

Hassan et al., "Pressure Swing Air Separation On A Carbon Molecular Sieve-Ii. Investigation Of A Modified Cycle With Pressure Equalization And No Purge", Chemical Engineering Science, 1987, pp. 2037-2043, vol. 42.

Shirley et al., "Air Separation by Carbon Molecular Sieves", Adsorption 8, 2002, pp. 147-155.

Office Action received for Canadian Patent Application No. 3,261,406, mailed on Jan. 28, 2026, 4 pages.

Office Action received for Japanese Patent Application No. 2025-500060, mailed on Feb. 3, 2026, 11 pages (5 pages of English Translation and 6 pages of Original Office Action).

Office Action received for Japanese Patent Application No. 2025-500060, mailed on Jun. 9, 2026, 4 pages (1 page of English Translation and 3 pages of Original Office Action).

* cited by examiner

OXYGEN-ENRICHED COMBUSTION FOR NATURAL GAS COMBINED CYCLE OPERATION

FIELD OF THE INVENTION

This invention relates to systems and methods for operating a combined cycle power plant using oxygen-enriched combustion to provide a flue gas with elevated $CO_2$ content.

BACKGROUND OF THE INVENTION

Combined cycle power plants provide an efficient way to generate electricity from the burning of petroleum products or other carbon-based fuels. Combined cycle power plants can leverage an initial combustion reaction to power multiple turbines for generation of electricity, leading to more efficient power generation. However, conventional methods for capturing carbon dioxide tend to reduce the efficiency of electricity generation, due to the additional energy required to capture and/or sequester the carbon dioxide For natural gas combined cycle (NGCC) plants, one of the difficulties with capturing $CO_2$ from the flue gas is that the concentration of $CO_2$ in the flue gas is relatively low. For natural gas combustion using air as the oxygen source, typical concentrations of $CO_2$ in the flue gas are between 4.0 vol % and 6.0 vol %. Due in part to the relatively low concentration of $CO_2$, a substantial amount of additional energy is required to capture $CO_2$ from the flue gas with an efficiency of 90% or greater. Additionally, because the $CO_2$ is dilute, substantial volumes of gas have to be processed, resulting in large capital equipment costs and/or large equipment footprint in order to effectively handle the required volume of flue gas. It would be desirable to have improved methods for capturing $CO_2$ from a flue gas while reducing or minimizing the power consumption and/or other costs required to perform the $CO_2$ capture.

U.S. Pat. Nos. 9,903,316 and 10,677,160 describe operation of natural gas combined cycle plants with enriched air as the oxygen source for combustion and a pressurized exhaust gas recycle. The resulting flue gas is described as containing an elevated amount of $CO_2$.

A journal article by Qinglin et al. (Revisiting Transport of Gases in the Micropores of Carbon Molecular Sieves" Langmuir (2003) 19, 393-405) describes measurements on carbon molecular sieves to determine equilibrium and kinetic parameters.

An article by Sircar et al (Fractionation of Air by Zeolites, In: Dąbrowski A, editor. Stud Surf Sci Catal: Elsevier; 1999. p. 395-423.) describes various pressure swing adsorption processes for separation of air using zeolites. Some processes are described that can generate both an $O_2$ stream and an $N_2$ stream that have purities of 90% or more. Generally, no processes are described where a first stream is produced that contains 95 vol % or more $N_2$ while also producing a second stream that contains 25 vol % to 48 vol % of $O_2$.

A journal article by Hassan et al. describes producing a high purity $N_2$ stream by separation of air. (Chemical Engineering Science, Vol. 42, No. 8, pg 2037 (1987)) No information is provided regarding the concentration of $O_2$ in a second stream produced by the process. It is noted that the process cycle described in the article performs pressure equalization by connecting both ends of the sorbent environment to each other.

A journal article by Shirley et al. describes producing a high purity $N_2$ stream by separation of air. (Adsorption, Vol.

8, No. pg 147 (2002)) No information is provided regarding the concentration of $O_2$ in a second stream produced by the process.

SUMMARY OF THE INVENTION

In an aspect, a method for operating a power generation process is provided. The method includes separating air using a pressure swing adsorption process to form a nitrogen-containing stream containing 95 vol % or more of $N_2$ and an oxygen-containing stream containing 25 vol % to 48 vol % of $O_2$. The method further includes combusting a fuel with $O_2$ from at least a portion of the oxygen-containing stream in the presence of a recycle stream in a combustion chamber of a turbine to form a flue gas. Optionally, the $O_2$ from the at least a portion of the oxygen-containing stream can correspond to 16 vol % to 35 vol % of a combined volume of the fuel, the at least a portion of the oxygen-containing stream, and the recycle stream. Optionally, the flue gas can contain 12 vol % or more of $CO_2$. The method further includes forming the recycle stream from one or more portions of the flue gas. Additionally, the method includes performing post-combustion capture on at least a portion of the flue gas to form a $CO_2$-containing product stream and one or more $CO_2$-depleted flue gas streams. The one or more $CO_2$-depleted flue gas streams can contain 30 vol % or less of the $CO_2$ from the at least a portion of the flue gas. Additionally or alternately, the $CO_2$-containing product stream can contain 70 vol % or more of the $CO_2$ from the at least a portion of the flue gas.

In another aspect, a system for generating power is provided. The system includes a swing adsorption stage corresponding to a plurality of swing adsorption vessels containing a sorbent having kinetic selectivity for $O_2$ relative to $N_2$. The swing adsorption stage can have an air inlet, a nitrogen-containing product outlet, and an oxygen-containing product outlet. The system further includes a turbine comprising a compressor, a combustion chamber, an expander, and a shaft coupling the expander to the compressor. The combustion chamber can include a combustion outlet and one or more combustion inlets. The one or more combustion inlets can be in fluid communication with a fuel source and with the oxygen-containing product outlet. Optionally, the system can further include a supplemental combustor having a supplemental fuel inlet, a flue gas inlet in fluid communication with the combustion outlet, and a supplemental combustion outlet. The system can further include a heat recovery steam generator having a heat recovery inlet in fluid communication with the combustion outlet and/or the supplemental combustion outlet, and a heat recovery outlet. Additionally, the system can include a post-combustion capture stage. The post-combustion capture stage can have a capture inlet in fluid communication with the heat recovery outlet, a $CO_2$-containing product outlet, and one or more $CO_2$-depleted stream outlets. In some aspects, the post-combustion capture stage can include one or more amine scrubbers, one or more sorbent environments comprising a solid sorbent, one or more sorbent environments comprising a liquid sorbent, or a combination thereof. In other aspects, the post-combustion capture stage can include one or more membrane separators, one or more molten carbonate fuel cells, or a combination thereof. The one or more combustion inlets can also be in fluid communication with at least one of the heat recovery outlet and the $CO_2$-containing product outlet.

DETAILED DESCRIPTION OF THE EMBODIMENTS

Figure 1:
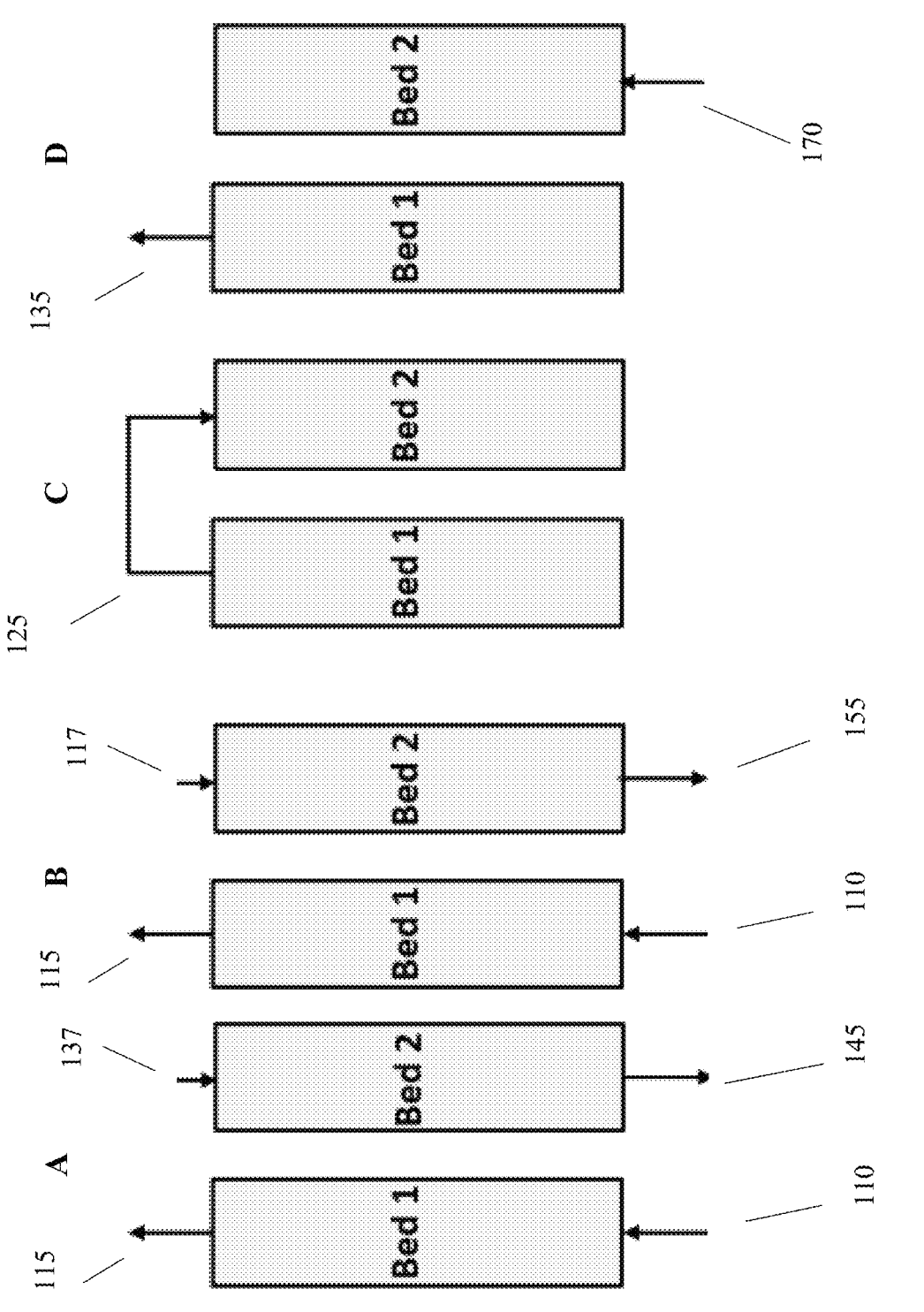
FIG. 1 illustrates a portion of a process cycle for separating air using a two bed system to form a nitrogen-containing stream and an oxygen-containing stream with target purity values.

All numerical values within the detailed description and the claims herein are modified by "about" or "approximately" the indicated value, and take into account experimental error and variations that would be expected by a person having ordinary skill in the art.

Overview

In various aspects, systems and methods are provided for operating a combined cycle power plant while enhancing the $CO_2$ content of the flue gas generated by the power plant. The $CO_2$ content is enhanced by using a combination of exhaust gas recycle and oxygen-enriched combustion. When operating a natural gas combined cycle power plant, this allows for formation of a flue gas with a $CO_2$ content between 12 vol % and 30 vol %, or 15 vol % to 30 vol %, or 20 vol % to 30 vol %. More generally, depending on the nature of the combustion reaction, the combination of exhaust gas recycle and oxygen-enriched combustion can allow for formation of flue gases having a $CO_2$ content of 12 vol % or more, or 15 vol % or more, or 20 vol % or more, or 25 vol % or more, or 30 vol % or more, such as up to 50 vol % or possibly still higher. The oxygen-containing flow for performing the oxygen-enriched combustion can be generated by an integrated pressure swing adsorption process that allows for production of a commercial grade nitrogen stream (95 vol % or more of $N_2$) while also providing an oxygen-containing stream with an oxygen content between 25 vol % and 48 vol %, or 30 vol % to 48 vol %, with high $O_2$ recovery. By enhancing the $CO_2$ content of the flue gas, all of the power generation stages of the combined cycle power plant can be maintained while still producing a flue gas with a sufficiently high $CO_2$ content to allow for enhanced, improved, and/or higher efficiency post-combustion capture of $CO_2$.

Conventionally, one of the difficulties with post-combustion capture of $CO_2$ from the flue gas generated by commercial scale power plants is the relatively low $CO_2$ content of the flue gas. For example, because a typical flue gas from a natural gas power plant only has a $CO_2$ content of 4.0 vol % to 6.0 vol %, the commercial scale options for capturing such $CO_2$ are limited. Currently, the primary option for capture of $CO_2$ from a flue gas is to use an amine scrubber, where the $CO_2$ is sorbed by an aqueous amine. While this is effective, the costs for operating such an amine scrubber are high due to the large volumes of flue gas that need to be processed. These costs include both capital equipment costs as well as operational costs for heating and managing the fluid flows involved in an amine scrubber.

Several options are available for increasing the $CO_2$ content of the flue gas from a power plant based on combustion of a hydrocarbonaceous fuel (such as a natural gas power plant). One option is to use exhaust gas recycle to increase the $CO_2$ concentration of the input flows to the combustion process. Another option is to reduce the nitrogen content of the oxygen-containing stream that is passed into the combustion process.

Exhaust gas recycle alone can raise the $CO_2$ content of the flue gas produced from a combustion reaction. There are limits, however, to the amount of exhaust gas recycle that can be performed. For example, when using air as the oxygen source for combustion, the air starts out with an $O_2$ content near 21 vol %. This is diluted by a small amount by the introduction of fuel into the combustion chamber. Adding exhaust gas recycle further dilutes the concentration of $O_2$. In order to maintain flame speed and/or other desirable combustion characteristics, it is desirable to maintain an $O_2$ concentration of 16 vol % or more in the combustion chamber. This limits the total volume of exhaust gas that can be recycled while still maintaining sufficient $O_2$ concentration.

There are also practical upper limits on the oxygen concentration in the combustion chamber. In particular, as the oxygen concentration increases, the flame speed and/or other combustion properties can result in higher temperatures in the combustion chamber. It is desirable to maintain the $O_2$ concentration in the combustion chamber at 35 vol % or less. This allows the combustion temperature to remain low enough that conventional metallurgy can be used, and therefore the process can be used in power plants that are already built using such conventional metallurgy.

Based on the above constraints, it would be desirable to have a combustion environment with an oxygen concentration between 16 vol % and 35 vol % while also increasing the $CO_2$ content of the flue gas. In order to achieve this, it is desirable to have an oxygen-containing stream for combustion with an oxygen content of 25 vol % to 48 vol %, or 30 vol % to 48 vol %, or 35 vol % to 48 vol %, or 40 vol % to 48 vol %, so that after dilution with fuel and the exhaust gas recycle stream, the target oxygen concentration of 16 vol % to 35 vol % can be achieved. Unfortunately, it is costly and/or inefficient using conventional methods to achieve such oxygen concentrations. This is due in part to the difficulty with generating an oxygen-containing stream having an oxygen content of 25 vol % to 48 vol % while still making a commercially viable nitrogen co-product. For example, cyrogenic air separation can form both a high purity nitrogen stream and a high purity oxygen stream. However, cyrogenic separation systems require substantial additional expense as well as specialized equipment. Additionally, the resulting high purity oxygen stream would then need to be diluted to achieve 25 vol % to 48 vol % of oxygen content.

In various aspects, systems and methods are provided that can allow for operation of a combustion-based power plant using both exhaust gas recycle and oxygen-enriched combustion while reducing or minimizing losses in efficiency and/or reducing or minimizing additional costs for equipment changes for the core power plant operation. This is achieved by integrating the power plant combustion process with an oxygen enrichment process that can produce both a nitrogen stream with greater than 95 vol % purity and an oxygen stream with 25 vol % to 48 vol % purity. By producing a nitrogen stream having 95 vol % or higher purity in conjunction with an oxygen stream containing 25 vol % to 48 vol % of oxygen, both streams from the process for generating the oxygen-containing stream can be used in further processes. This is in contrast to conventional methods for producing an pure oxygen stream product then diluting it to produce enriched air containing 25 vol % to 48 vol % of oxygen, which either involve a) the substantial additional expense and equipment for performing cryogenic air separation, followed by dilution of the oxygen stream, or b) the substantial additional expense and equipment for performing pressure vacuum swing air separation with cationic zeolites to produce $O_2$ product, where the resulting nitrogen co-product stream essentially corresponds to a waste stream due to not having sufficient purity. It is noted that vacuum swing air separation with cationic zeolites also requires an additional dehydration step to remove water to allow cationic zeolites to carry out the $N_2$—$O_2$ separation while functioning properly for both thermodynamic and kinetic adsorption properties for air separation.

By operating a power plant using both exhaust gas recycle and oxygen-enriched combustion, additional options become available for post-combustion capture of $CO_2$ from the resulting flue gas stream. In some aspects, the enhancement in $CO_2$ concentration in the flue gas can allow for a reduced or minimized size for an amine scrubber, thus reducing both equipment costs and operating costs. In other aspects, the enhancement in $CO_2$ concentration in the flue gas can enable use of other types of $CO_2$ post-combustion capture technologies, such as using membrane separation, separation using a fuel cell (such as a molten carbonate fuel cell), or direct displacement.

With regard to using an amine scrubber, using both exhaust gas recycle and oxygen-enriched combustion can substantially reduce the total volume of flue gas that is processed by an amine plant. The reduction in flue gas volume is due to several factors. First, the volume of the oxygen-containing gas delivered to the combustion reaction is selected based on a target ratio of fuel to $O_2$ in the combustion chamber. In other words, the flow rate of $O_2$ into the combustion chamber is used to select the amount of oxygen-containing gas flow, not the total gas flow rate for the oxygen-containing gas flow. A higher $O_2$ content in the oxygen-containing gas means that less total gas flow can be delivered to the combustion chamber while still providing the same $O_2$ gas flow rate needed to achieve the target ratio of fuel to $O_2$. Increasing the $O_2$ content of the oxygen-containing flow to between 25 vol % and 48 vol % corresponds to increasing the $O_2$ content of the oxygen-containing gas by a factor of roughly 1.5 to 2.5 relative to air. Thus, the amount of oxygen-containing gas delivered to the combustion chamber can be reduced by a similar factor. The amount of $N_2$ diluent in the oxygen-containing gas is also reduced. It is noted that any reduction in $N_2$ in the gas flow corresponds to a reduction in the amount of $N_2$ that subsequently has to be separated from $CO_2$ to perform carbon capture. By using oxygen-enriched combustion, the volume of flue gas that has to be processed by a carbon capture system can be reduced by 40 vol % to 70 vol % (or possibly still higher) relative to the volume of flue gas that is processed when using air as the oxygen-containing gas.

It is noted that by increasing the oxygen content in the combustion zone, the resulting flue gas can also have an increased concentration of oxygen. In aspects where an amine scrubber is used as the post-combustion capture process, this increased concentration of oxygen can potentially lead to increased degradation of the amines, as some types of amines are susceptible to oxidative degradation in the presence of sufficient amounts of oxygen at sufficiently high temperatures. In some aspects, the oxygen concentration of the flue gas can be reduced by using a duct burner. A duct burner can be located, for example, prior to the heat recovery steam generator (HRSG) of a combined cycle power plant.

With regard to other options, another difficulty with amine scrubbers is the relatively high energy cost per $CO_2$ molecule that is captured. After performing $CO_2$ capture with an amine scrubber, the aqueous amine has to be regenerated, such as by using a thermal regeneration cycle. Increasing the $CO_2$ concentration of the flue gas can mitigate this cost by reducing the volume of aqueous amine that is needed, but there is a thermodynamic limit to how much energy reduction can be achieved while still regenerating the aqueous amine.

In aspects where the $CO_2$ content of the flue gas/other gas for post-combustion capture is 12 vol % or higher, or 15 vol % or higher, or 20 vol % or higher, an alternative to using an aqueous amine can be to use a membrane separation method. Membrane systems are commercially available (such as polymeric membranes) that can provide a separation factor of roughly 50 for separation of $CO_2$ from $N_2$. In combination with using a reduced pressure on the permeate side/an increased pressure on the retentate side to provide driving force, such membranes can be used to perform a separation on a flue gas having a $CO_2$ content of 12 vol % or higher to produce a permeate stream. By using a membrane separation for $CO_2$ capture, the thermal costs for regenerating a sorbent can be avoided and replaced with the lower cost of maintaining a pressure differential across the membrane. In addition to the direct cost savings by avoiding the need for heating and cooling, such thermal costs can include, but are not limited to, avoiding the need for a stripper/reboiler unit, avoiding the need for additional heat exchangers, avoiding any emissions associated with generating heat, and avoiding the losses that are incurred when heating and cooling various fluids to perform heat exchange.

A membrane separator is one example of a type of post-combustion capture stage. More generally, a variety of post-combustion capture options are available for processing of a $CO_2$-containing flue gas, such as the exhaust gas from a combustion chamber of a turbine. In various aspects, a post-combustion capture stage can separate a flue gas (or a portion thereof) to form one or more $CO_2$-depleted streams and at least one $CO_2$-containing stream. The $CO_2$-containing stream can contain 70 vol % or more of $CO_2$, or 80 vol % or more, or 90 vol % or more, such as up to being substantially entirely composed of $CO_2$. In some aspects, such a $CO_2$-containing stream can correspond to 70 vol % or more of the $CO_2$ that was present in the combustion exhaust, or 80 vol % or more, or 90 vol % or more (such as up to 100 vol % of the $CO_2$ that was present in the combustion exhaust). Additionally or alternately, the recovery of $CO_2$ by the post-combustion process can also be characterized based on the relative amount of $CO_2$ that exits the system via the one or more $CO_2$-depleted streams. In other words, the post-combustion process can be characterized based on the amount of $CO_2$ present in the one or more $CO_2$-depleted streams relative to the amount of $CO_2$ present in the flue gas.

It is noted that if a supplemental combustion device (such as a duct burner) is located downstream from the combustion chamber to reduce the oxygen content of the flue gas, the comparison of the one or more $CO_2$-depleted streams and/or the $CO_2$-containing stream with the flue gas can be performed based on the composition of the combustion exhaust after passing through the supplemental combustion device. In some aspects, the $CO_2$ content of the one or more $CO_2$-depleted stream can correspond to 30 vol % or less of the $CO_2$ present in the exhaust gas from the combustion chamber (after any optional duct burner), or 20 vol % or less, or 10 vol % or less, or 5.0 vol % or less, or 2.0 vol % or less, or 1.0 vol % or less, such as down to 0.1 vol % of the $CO_2$ present in the flue gas (or possibly still lower).

A $CO_2$ content in the flue gas of 15 vol % or more, or 20 vol % or more, or 25 vol % or more, can be achieved by using oxygen-enriched combustion so that the oxygen-containing gas has an $O_2$ content of 35 vol % or more, or 40 vol % or more. Additionally or alternately, such $CO_2$ contents in the flue gas can be achieved by using selective exhaust gas recycle, where the exhaust gas recycle stream has a $CO_2$ content of 70 vol % or more, or 80 vol % or more, or 90 vol % or more. Such a selective exhaust gas recycle stream can be formed, for example, by using a portion of the high purity $CO_2$ stream that is produced after capture of the $CO_2$ from the flue gas. Further additionally or alternately, in some aspects a supplemental combustion stage (such as a duct burner) can be used to both lower the $O_2$ content of a flue gas and increase the $CO_2$ content.

In this discussion, post-combustion capture is defined as one or more separation processes that separates a $CO_2$-containing input gas flow (such as a combustion exhaust) into one or more $CO_2$-depleted streams and at least one $CO_2$-containing product stream. A $CO_2$-depleted stream is defined as an output stream that contains a lower vol % of $CO_2$ than the $CO_2$ content of the $CO_2$-containing input gas flow. A $CO_2$-containing product flow is defined as an output stream that contains a higher vol % of $CO_2$ than the $CO_2$ content of the $CO_2$-containing input gas flow. It is noted that some post-combustion capture processes, such as molten carbonate fuel cells, may have multiple input flows. For molten carbonate fuel cells, the total cathode input flow is used to determine whether an output flow corresponds to a $CO_2$-depleted stream or a $CO_2$-containing product flow.

As a still further benefit, it is noted that a substantial portion of the cost for performing the oxygen-enrichment process can be offset by the fact that both the $N_2$ stream and the $O_2$ stream generated by the process can be used. Traditionally, air separation units are designed to generate either an $N_2$ stream or an $O_2$ stream, with any other streams from the process corresponding to waste streams of effectively no value. By contrast, for the oxygen-enrichment process described herein that is integrated with the combustion-based power plant, the $N_2$ stream also has a sufficient purity (95 vol % or more, or 98 vol % or more) so that the $N_2$ stream can be used in another co-located process and/or sold as a commercial product. It is further noted that in some aspects, the $N_2$ stream generated by the process is actually at elevated pressure, which means that integration of the $N_2$ with a co-located process that operates at elevated pressure will have a reduced energy cost for compression of the $N_2$.

Formation of $O_2$-Containing Stream and High Purity $N_2$ Stream

In various aspects, the source of oxygen for a combustion process in a power plant can be provided by an integrated separation process that produces both a higher purity $N_2$ stream (95 vol % or more) and an oxygen-containing stream with an oxygen ($O_2$) content of 25 vol % to 48 vol %. It has been discovered that such a nitrogen-containing stream and oxygen-containing stream can be generated by performing a kinetic separation on air using a pressure swing adsorption process in combination with a suitable sorbent material. Optionally, the pressure swing adsorption process can include one or more desorption steps that are performed at a pressure of 100 kPa-a or less. In such optional aspects, the resulting oxygen-containing stream can be formed at a pressure of 100 kPa-a or less.

Conventionally, cryogenic air separation units can be used to generate both a high purity nitrogen stream and a high purity oxygen stream in large quantities. While this is effective, the high pressures and cryogenic separations involved with use of an air separation unit mean that the resulting oxygen is costly to produce. Such high purity oxygen could be diluted to achieve a concentration of 25 vol % to 48 vol %, but this is a costly way to generate an oxygen stream that is only modestly concentrated relative to air. This approach normally requires large space to operate and long start-up time on the order of days. Additionally, air separation units have improved efficiency as the throughput increases, but tend to be excessively costly for production of small volumes of gases.

Another option is to use a non-cryogenic adsorption approach using zeolite sorbents that are selective for nitrogen sorption, and therefore produce high purity oxygen as product, such as in a pressure swing adsorption (PSA) process. Examples of such processes are described in an article by Sircar et al., (Fractionation of Air by Zeolites, In: Dąbrowski A, editor. Stud Surf Sci Catal: Elsevier; 1999. p. 395-423). However, such processes do not allow for formation of both a high purity nitrogen stream containing 95 vol % or more of $N_2$ and an oxygen-containing stream containing 25 vol % to 48 vol % of $O_2$.

It has been discovered that a separation can be performed to produce both a stream containing 25 vol % to 48 vol % oxygen and a second stream containing 95 vol % or more of nitrogen by performing a kinetic separation using a suitable kinetic adsorbent and using an improved process cycle. The level of $O_2$ enrichment can be adjusted related to recovery as well as $N_2$ purity and recovery. It is noted that a higher recovery requirement usually results in lower purity; similarly, higher purity typically comes with sacrifice of recovery. The separations provided herein can use this trade-off between recovery and purity to provide flexibility in cycle operation. For example, in some aspects the amount of $O_2$ enrichment for the combustion process and/or the purity of the $N_2$ product can be adjusted by adjusting the process to reduce recovery of $N_2$ and/or $O_2$. This provides a more adjustable specification of both the $N_2$ product and $O_2$ enriched streams compared to cryogenic air separation unit. In some aspects, the stream containing 25 vol % to 48 vol % of $O_2$ can also contain 50 vol % or more of $N_2$.

One type of sorbent for performing such a kinetic separation is a carbon molecular sieve, which is used in some commercial $N_2$ generators. Another type of sorbent that can be used is ITQ-55, which is a zeolitic material. ITQ-55 is described in detail, for example, in U.S. Pat. Nos. 9,695,056, 9,738,539, and 9,856,145. Still other types of sorbents that can perform kinetic separations of $N_2$ are also known, such as ETS-4. Generally, any kinetic sorbent can be used that provides sufficient kinetic selectivity for $O_2$ relative to $N_2$ that, when used in conjunction with the improved separation process described herein, allows for formation of effluents corresponding to a) a high purity nitrogen stream containing 95 vol % or more of $N_2$ and b) an oxygen-containing stream with an oxygen content of 30 vol % to 50 vol %. The $N_2$ corresponds to a sufficiently high purity stream to be commercially valuable, while the oxygen-containing stream has the target oxygen concentration for use in oxygen-enriched combustion. As used herein, the term "kinetic selectivity" is defined as the ratio of single component diffusion coefficients, D (in $m^2$/sec), for two different species. These single component diffusion coefficients are also known as the transport diffusion coefficients that are measured for a given adsorbent for a given pure gas component. Therefore, for example, the kinetic selectivity for a particular adsorbent for component A with respect to component B would be equal to $D_A/D_B$. The single component diffusion coefficients for a material can be determined by tests well known in the adsorptive materials art. The preferred way to measure the kinetic diffusion coefficient is with a frequency response technique described by Reyes et al. in "Frequency Modulation Methods for Diffusion and Adsorption Measurements in Porous Solids", J. Phys. Chem. B. 101, pages 614-622, 1997.

In addition to using a suitable sorbent, the kinetic separation is performed using an improved separation process that facilitates forming both a nitrogen-containing stream and an oxygen-containing stream with the target purity levels. The improved kinetic separation process can involve having a plurality of sorbent vessels. The improved process benefits from integrating flows from different stages in the sorption/desorption process. This integration of flows from different stages in the sorption/desorption process enables the recovery of both an oxygen-containing stream having an oxygen content of 25 vol % to 48 vol % and a nitrogen-containing stream with a purity of 95 vol % or more.

In some aspects, the sorption/desorption cycle can correspond to a pressure swing adsorption process that includes a total of eight steps. In this example, the process is described using a two bed system, with the sorbent beds being roughly comparable in size and the vessels containing the sorbent beds being roughly comparable in volume. The process in this example for the two bed system is symmetric in time, so that the steps occurring in pairs of beds are synchronized. For the eight step cycle, when step 1 is occurring in one bed, step 5 occurs in the other bed. When step 2 occurs in one bed, step 6 occurs in the other bed. When step 3 occurs in one bed, step 7 occurs in the other bed. When step 4 occurs in one bed, step 8 occurs in the other bed. It is noted that with more beds, other synchronous process flows could be developed.

In this example, both Step 1 and Step 2 correspond to adsorption steps, where the sorbent is exposed to flow of air. This produces a sorbent with an increased loading of oxygen, and an adsorption effluent that has a nitrogen content of 95 vol % or more. Because the loading of oxygen on the sorbent is driven by kinetics, a high percentage of the oxygen can be removed from the flow, allowing for a purity of 95 vol % or more of nitrogen, or 97 vol % or more, or 98 vol % or more, such as up to substantially all of the adsorption effluent corresponding to nitrogen. This step is performed at an elevated pressure, such as between 200 kPa-a and 800 kPa-a. Various temperatures can be used. Temperatures near room temperature can be convenient for processing, but lower temperatures can potentially provide a higher purity adsorption effluent. In some aspects, the temperature can be between −100° C. and 40° C. The velocity of air in the sorption environment during the adsorption steps can vary depending on the configuration of the sorbent environment. In some aspects, the gas velocity during the sorption steps can be roughly between 0.01 m/s and 1.0 m/s.

The resulting adsorption effluent having an $N_2$ content of 95 vol % or more is produced at a pressure similar to the pressure during the adsorption step. In some aspects, any convenient source of air can be used as the input flow for Step 1 and Step 2. In some aspects, such as aspects where the separation is performed at temperatures between 0° C. and 40° C., the air for use as the input flow for Step 1 and/or Step 2 can have a relative humidity of 60% or less, or 50% or less, or 40% or less, such as down to having substantially no water content (and therefore effectively 0% relative humidity).

Step 3 corresponds to a pressure equalization step, where the first bed and the second bed are placed in fluid communication. The pressure from the first bed is allowed to equalize with the pressure in the second bed. In some aspects, this pressure equalization is performed by connecting the top of the first bed with the top of the second bed. Pressurizing using a flow only from the top of the pressurized bed can assist with improving the purity of the $O_2$ stream generated by the separation process. This is in contrast to a pressure equalization process where pressure equalization is performed using gas flows from both ends of the pressurized bed. Such an equalization step from both ends of the pressurized bed can be used in processes where the only product of interest is a high purity $N_2$ product. At the start of the pressure equalization step, the first bed will be at a pressure between 200 kPa-a and 800 kPa-a, while the second bed will be at a pressure near ambient (i.e., roughly 100 kPa-a). After equalization, the pressure in the beds will roughly correspond to an average of the initial pressures. Because this is a pressure equalization step, the output flow from one bed serves as the input flow to the other bed.

Step 4 corresponds to a blowdown step, to reduce the pressure in the first bed to roughly ambient pressure (roughly 100 kPa-a). Because pressure is being released, no input flow is needed for the blowdown step. The blowdown step generates a blowdown exhaust. This blowdown exhaust corresponds to a stream with low $O_2$ content and elevated $N_2$ content relative to air. In some aspects, the $O_2$ content in the blowdown exhaust can be between 5.0 vol % and 14 vol %, or 5.0 vol % to 12 vol %, or 8.0 vol % to 12 vol %.

Step 5 corresponds to a first counter-current purge step. This purge step is referred to as "counter-current" since the flow is in the opposite direction relative to the flow in Step 1. In some aspects, the first counter-current purge step is performed using a portion of the blowdown exhaust as the input flow. In this example, roughly half of the total blowdown exhaust is used as the purge gas for this counter-current purge. This step is performed at roughly ambient pressure, or roughly 100 kPa-a. This generates a first purge exhaust flow. This first purge exhaust flow is enriched in oxygen, and corresponds to a stream containing 25 vol % to 34 vol % of $O_2$. It is noted that still higher $O_2$ concentrations may be possible, but at the expense of reducing the amount of $O_2$ recovered per volume of air processed in the system.

It is noted that using the blowdown exhaust as the input flow for the first purge input flow is an unexpected choice. The blowdown exhaust is enriched in nitrogen, and contains 5.0 vol % and 14 vol %, or 5.0 vol % to 12 vol %, or 8.0 vol % to 12 vol %. Thus, a higher purity $O_2$ effluent could be generated by using air as the first purge input flow. However, because a kinetic separation is being performed, using air as the first purge input flow would leave too much $O_2$ still sorbed to the sorbent at the end of the first purge step. This would prevent the adsorption effluent from containing 95 vol % or more of $N_2$ in the adsorption step in a subsequent cycle. It is further noted that use of a portion of the blowdown exhaust as the input flow for step 5 substantially increases recovery of both $N_2$ and $O_2$ relative to the volume of gas processed in the system. If a separate $N_2$ flow was used as the input for step 5, such an $N_2$ flow would offset the benefit of generating a high purity $N_2$ flow as part of the products, thus reducing the yield of high purity $N_2$. With regard to $O_2$, use of the blowdown exhaust allows for recovery of a portion of the $O_2$ present in the blowdown exhaust.

Step 6 corresponds to a second counter-current purge step. In the second counter-current purge step, the input flow for the second purge is part of the adsorption effluent from step Table 1 shows an example of a process cycle based on the above 8 steps. As an example of timing for the process cycle shown in Table 1, Step 1 and Step 2 can each last for 10 seconds. This matches the length of Step 5 and Step 6, which can also be 10 seconds each. Step 3 can last for 2 seconds, which matches Step 7. Step 4 can last for 0.5 seconds, which matches step 8. In other aspects, any other convenient combination of process step lengths can be used, so long as appropriate beds are available at the same time for the pressure equalization steps.

TABLE 1

| | Sorption/Desorption Process Cycle Example | | | |
|---|---|---|---|---|
| Step | Bed 1 | | Step | Bed 2 |
| 1 | Adsorption step 1 - co-current adsorption to make adsorption effluent | | 5 | First purge step - counter-current purge using roughly half of blowdown effluent |
| 2 | Adsorption step 2 - co-current adsorption to make adsorption effluent | | 6 | Second purge step - counter-current purge using a portion of adsorption effluent |
| 3 | De-pressurize equalization with Bed 2 from bed top | | 7 | Re-pressurize equalization with Bed 1 from bed top |
| 4 | Co-current blowdown to atmospheric pressure; forms blowdown exhaust | | 8 | Co-current feed pressurization |
| 5 | First purge step - Counter-current purge using roughly half of blowdown exhaust | | 1 | Adsorption step 1- co-current adsorption |
| 6 | Second purge step - counter-current purge using a portion of adsorption effluent | | 2 | Adsorption step 2 - co-current adsorption |
| 7 | Re-pressurize equalization with Bed 2 from bed top | | 3 | De-pressurize equalization with Bed 1 from bed top |
| 8 | Co-current feed pressurization | | 4 | Co-current blowdown to atmospheric pressure; forms blowdown exhaust |

1. The output flow corresponds to a second purge exhaust. Using a high purity nitrogen stream (95 vol % or more of $N_2$) as the second purge input flow is needed for the adsorption effluent to correspond to a high purity nitrogen stream. Otherwise, too much oxygen would remain sorbed to the sorbent after the purge. This would reduce the purity of $N_2$ in the adsorption effluent generated in the next adsorption step. By using the high purity adsorption effluent as the second purge input flow, the high purity for the adsorption effluent can be maintained in subsequent process cycles. However, by using part of the adsorption effluent for the second purge, the yield of high purity nitrogen is reduced. It is noted that a high purity nitrogen stream from another source could be used in this step, such as at the beginning of a process run when the adsorption effluent is not available yet.

Step 7 corresponds to another pressure equalization step. This time, the first bed is lower in pressure (roughly 100 kPa-a) and the second bed is at the higher pressure. Otherwise, this step is similar to Step 3. It is noted that the pressure equalization steps increase the yield of $N_2$ relative to the overall volume of gas that is processed. The pressure equalization steps also increase the $O_2$ content in the blow-down exhaust.

Step 8 corresponds to a feed pressurization step. During pressurization, air is passed into the sorbent environment to reach the target pressure for the adsorption step, such as a pressure of 200 kPa-a to 800 kPa-a. This prepares the sorbent environment for the next process cycle.

Figure 2:
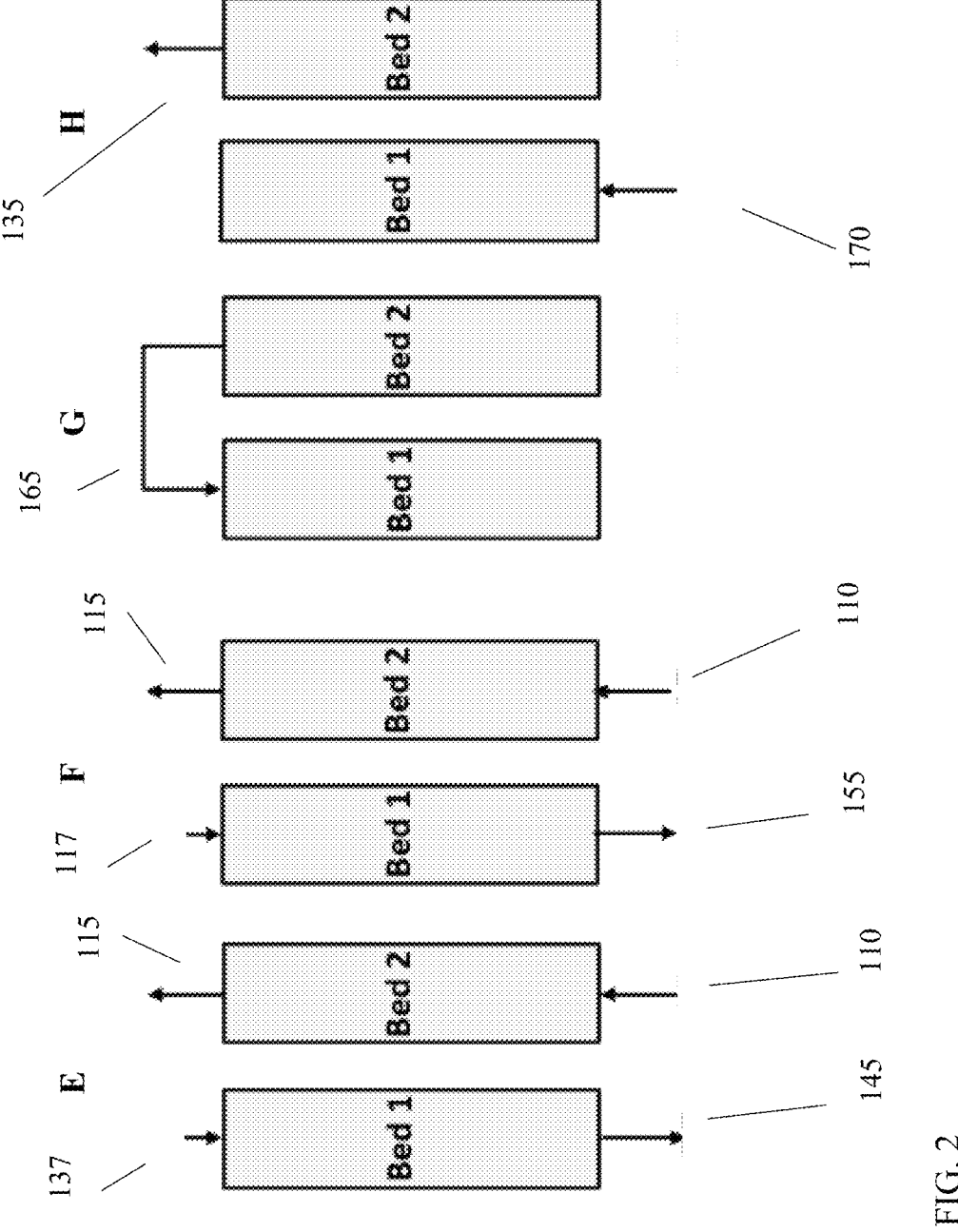
FIG. 2 illustrates another portion of the process cycle for separating air using a two bed system to form a nitrogen-containing stream and an oxygen-containing stream with target purity values.

FIG. 1 and FIG. 2 show a representation of the eight-step sorption/desorption cycle shown in Table 1. FIG. 1 shows the first four steps of the cycle for the first sorbent environment, while FIG. 2 shows the final four steps of the cycle for the first sorbent environment. Thus, FIG. 1 also shows the final four steps of the cycle for the second sorbent environment, and FIG. 2 shows the first four steps of the cycle for the second sorbent environment. FIGS. 1 and 2 represent points in time where the beds are in each of the steps of the cycle.

In FIG. 1, A corresponds to the first adsorption step (Step 1) for Bed 1 and the first purge step (Step 5) for Bed 2. During this time, input air flow 110 is passed into Bed 1, resulting in formation of adsorption effluent 115. During this time, a portion 137 of blowdown effluent 135 is used as the first purge input flow for Bed 2, resulting in formation of first purge exhaust 145. In FIG. 1, B corresponds to the second adsorption step (Step 2) for Bed 1 and the second purge step (Step 6) for Bed 2. During this time, input air flow 110 continues to pass through Bed 1 to form adsorption effluent 115. During this time, a portion 117 of the adsorption effluent 115 is used as the input flow for Bed 2, resulting in formation of second purge exhaust 155. In FIG. 1, C corresponds to the pressure equalization step, where Bed 1 is de-pressurized (Step 3) by exhausting flow 125 that is passed into Bed 2 for pressurization (Step 7). In FIG. 1, D corresponds to a blowdown step (Step 4) for Bed 1, where the remaining pressure is exhausted from Bed 1 to form blowdown exhaust 135. D also corresponds to Step 8 for Bed 2, where Bed 2 is pressurized using air flow 170.

FIG. 2 is parallel to FIG. 1, but with Bed 1 performing Steps 5 to 8 and Bed 2 performing Steps 1 to 4. In FIG. 2, E corresponds to Step 5 for Bed 1 and Step 1 for Bed 2. In FIG. 2, F corresponds to Step 6 for Bed 1 and Step 2 for Bed 2. In FIG. 2, G corresponds to another pressure equalization step, where Bed 2 is de-pressurized (Step 7) by exhausting flow 165 that is passed into Bed 1 for pressurization (Step 3). In FIG. 2, H corresponds to Step 8 for Bed 1 and Step 4 for Bed 2.

Higher O$_2$ Content Via Vacuum Pressure Swing Adsorption

The process shown in Table 1 and FIGS. 1 and 2 corresponds to a process where all of the steps are performed at roughly ambient pressure or higher. In other aspects, higher O$_2$ concentrations can be achieved in the oxygen-containing stream while still maintaining a high purity nitrogen stream by using pressures below 100 kPa-a to form the oxygen-containing stream. Thus, in such other aspects, the sorption/desorption process can correspond to a vacuum pressure swing adsorption process. The same types of sorbents can be used for such a vacuum pressure swing adsorption process. By using vacuum pressure swing adsorption (VPSA), an oxygen-containing stream can be generated with an O$_2$ content of 25 vol % to 48 vol %, or 30 vol % to 48 vol %, or 35 vol % to 48 vol %, or 40 vol % to 48 vol %. It is noted that VPSA is a type of PSA process, and therefore a reference to a pressure swing adsorption process without further specification can refer to either a process performed at ambient pressures or above, or to a vacuum pressure swing adsorption process that includes at least one step performed at pressures below 100 kPa-a.

One example of a vacuum pressure swing adsorption (VPSA) process that can form a nitrogen-containing stream with an N$_2$ content of 95 vol % or more and an oxygen-containing stream containing 30 vol % to 48 vol % O$_2$ is a six step process. For illustration of the process, the process can be described for a system having two sorbent beds that are synchronized so that both beds are at a pressure equalization step at the same time. In this example of a VPSA process, the various steps can be performed at roughly ambient temperature, although lower temperatures could also be used.

In this example, Step 1 of the VPSA process corresponds to an adsorption step, where the sorbent is exposed to flow of air. This produces a sorbent with an increased loading of oxygen, and an adsorption effluent that has a nitrogen content of 95 vol % or more. Because the loading of oxygen on the sorbent is driven by kinetics, a high percentage of the oxygen can be removed from the flow, allowing for a purity of 95 vol % or more of nitrogen, or 97 vol % or more, or 98 vol % or more, such as up to substantially all of the adsorption effluent corresponding to nitrogen. This step is performed at an elevated pressure, such as between 200 kPa-a and 800 kPa-a. The resulting adsorption effluent having an N$_2$ content of 95 vol % or more is produced at a pressure similar to the pressure during the adsorption step. The input flow rate during Step 1 of the VPSA process can be similar to the flow rate for Step 1 or Step 2 (adsorption steps) of the process shown in Table 1.

Step 2 of the VPSA process corresponds to a pressure equalization step, where the first bed and the second bed are placed in fluid communication. The pressure from the first bed is allowed to equalize with the pressure in the second bed. At the start of the pressure equalization step, the first bed will be at a pressure between 200 kPa-a and 800 kPa-a, while the second bed will be at a pressure of 50 kPa-a or less. After equalization, the pressure in the beds will roughly correspond to an average of the initial pressures. Because this is a pressure equalization step, the output flow from one bed serves as the input flow to the other bed.

It is noted that this pressure equalization step is valuable for increasing recovery. In particular, after the end of the adsorption step, the pressurized gas remaining in the first bed has a composition similar to the composition of the adsorption effluent. By performing pressure equalization, this high N$_2$ content gas is used to pressurize the second bed, which has just finished a desorption step. By performing pressure equalization, the high N$_2$ content gas from the first bed is used to provide a substantial portion of the pressurization of the second bed. The step using equalization from top is beneficial for producing high purity nitrogen with improved recovery for both oxygen and nitrogen.

Step 3 of the VPSA process corresponds to a blowdown step, to reduce the pressure in the first bed to roughly ambient pressure (roughly 100 kPa-a). Because pressure is being released, no input flow is needed for the blowdown step. The blowdown step generates a blowdown exhaust.

Step 4 of the VPSA process corresponds to a vacuum desorption step. The pressure in the sorbent environment is reduced to a pressure between 1.0 kPa-a and 50 kPa-a, or 1.0 kPa-a to 20 kPa-a, or 1.0 kPa-a to 10 kPa-a, or 5.0 kPa-a to 50 kPa-a, or 5.0 kPa-a to 20 kPa-a. This vacuum desorption step is referred to as "counter-current" since output flow exits from the sorbent environment from the end opposite from where the adsorption effluent exits from the sorbent environment. The vacuum desorption exhaust is enriched in oxygen, and corresponds to a stream containing 25 vol % to 48 vol % of O$_2$, or 30 vol % to 48 vol %, or 35 vol % to 48 vol %, or 40 vol % to 48 vol %, or 35 vol % to 44 vol %.

Step 5 corresponds to another pressure equalization step. This time, the first bed is lower in pressure (1.0 kPa-a to 50 kPa-a) and the second bed is at the higher pressure. Otherwise, this step is similar to Step 2.

Step 6 corresponds to a feed pressurization step. During pressurization, air is passed into the sorbent environment to reach the target pressure for the adsorption step, such as a pressure of 200 kPa-a to 800 kPa-a. This prepares the sorbent environment to repeat the cycle.

Table 2 shows an example of the above VPSA cycle with timings for the various steps. As an example of timing for the process cycle shown in Table 2, Step 1 can be performed for 20 seconds, which can match the length of Step 4. Step 2 can be performed for 2 seconds, matching step 5. Step 3 can be performed for 0.5 seconds, matching step 6.

TABLE 2

| | Example of VPSA Process Cycle | |
|---|---|---|
| Step | Bed 1 | Bed 2 |
| 1 | Adsorption to generate adsorption effluent | Counter-current desorption under vacuum |
| 2 | De-pressurize equalization with Bed 2 from bed top | Re-pressurize equalization with Bed 1 from bed top |

TABLE 2-continued

| | Example of VPSA Process Cycle | |
| --- | --- | --- |
| Step | Bed 1 | Bed 2 |
| 3 | Blowdown to atmospheric pressure | Feed pressurization |
| 4 | Counter-current desorption under vacuum | Adsorption to generate adsorption effluent |
| 5 | Re-pressurize equalization with Bed 2 from bed top | De-pressurize equalization with Bed 1 from bed top |
| 6 | Feed pressurization | Blowdown to atmospheric pressure |

Figure 7:
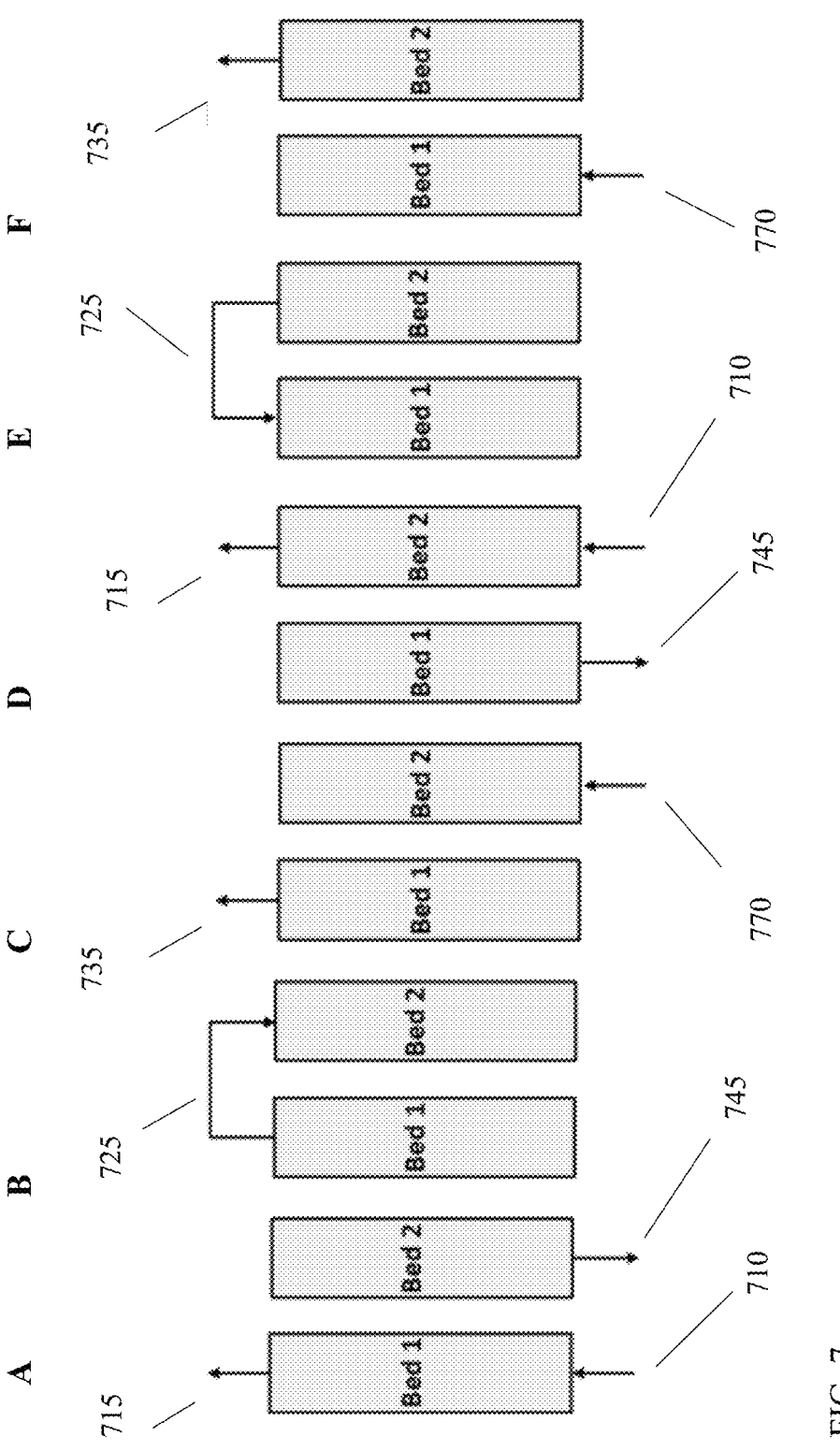
FIG. 7 illustrates another process cycle for separating air using a two bed system to form a nitrogen-containing stream and an oxygen-containing stream with target purity values.

FIG. 7 shows a representation of the six-step sorption/desorption cycle shown in Table 2. FIG. 7 represents points in time where the beds are in each of the steps of the cycle.

In FIG. 7, "A" corresponds to the adsorption step (Step 1) for Bed 1 and the desorption step (Step 4) for Bed 2. During this time, input air flow 710 is passed into Bed 1, resulting in formation of adsorption effluent 715 (the nitrogen-enriched product). During this time, a counter-current desorption is performed for Bed 2 while reducing the pressure to a pressure between 1.0 kPa-a and 50 kPa-a. The output 745 from this step corresponds to the oxygen-enriched product. In FIG. 7, B corresponds to the pressure equalization step, where Bed 1 is de-pressurized (Step 2) by exhausting flow 725 that is passed into Bed 2 for pressurization (Step 5). In FIG. 1, C corresponds to a blowdown step (Step 3) for Bed 1, where the remaining pressure is exhausted from Bed 1 to form blowdown exhaust 735. C also corresponds to Step 6 for Bed 2, where Bed 2 is pressurized using air flow 770. Steps D, E, and F, are similar to steps A, B, and C, but with Bed 1 and Bed 2 having opposite roles.

Exhaust Gas Recycle

In various aspects, exhaust gas recycle (EGR) can be used to further increase the $CO_2$ concentration in the flue gas from the combustion process. One option for exhaust gas recycle is to recycle a portion of the flue gas after power generation is completed. For example, the flue gas exiting from a heat recovery generator system can be used as the source of exhaust gas for recycle. In this type of aspect, the recycled exhaust gas can contain a variety of components, including $CO_2$, $N_2$, water formed during combustion, and any $O_2$ and/or fuel that was not reacted during the combustion process. By using oxygen-enriched combustion, the amount of exhaust gas that can be recycled can be increased while still maintaining an $O_2$ concentration in the combustion chamber of 16 vol % to 35 vol %.

Further increases in the amount of exhaust gas recycle can be achieved if selective exhaust gas recycle (SEGR). Selective exhaust gas recycle uses a portion of the high purity $CO_2$ stream that is formed during and/or after post-combustion capture as the recycle stream. As a result, selective exhaust gas recycle uses a recycle stream containing 70 vol % or more of $CO_2$, or 80 vol % or more, or 90 vol % or more, such as up to being substantially entirely composed of $CO_2$. It is noted that the $CO_2$ stream formed after capture may involve multiple recovery stages (such as multiple membranes or multiple serial swing adsorption vessels) in order to achieve a final $CO_2$ purity of 90 vol % or more. Thus, recycle streams with a $CO_2$ content of less than 90 vol % may be available in aspects where the final high purity $CO_2$ stream has a $CO_2$ content greater than 90 vol %.

In various aspects, the flow rate of gases into a combustion chamber can be characterized based on the relative volume percentages (at 20° C. and 100 kPa-a) of the gas flows entering the combustion chamber. These gas flows correspond to the oxygen-containing gas flow, the recycled exhaust gas, and the fuel flow. It is noted that these flows can be combined prior to entering the combustion chamber. For example, in some aspects the exhaust gas recycle flow and the oxygen-containing flow can be combined prior to entering the main compressor for a natural gas turbine, with the fuel flow being added separately to the combustion chamber. Depending on the aspect, the exhaust gas recycle flow can correspond to 25 vol % to 60 vol % of the input flows to the combustion chamber, or 35 vol % to 60 vol %, or 45 vol % to 60 vol %. It is noted that when performing exhaust gas recycle with air as the oxygen-containing flow, using an exhaust gas recycle of more than 20 vol % would cause the oxygen content in the combustion chamber to drop below 16 vol %.

In some aspects, the exhaust gas recycle flow can be combined with the oxygen-containing gas flow at a pressure of 95 kPa-a to 115 kPa-a, or 100 kPa-a to 115 kPa-a. The combined flow of exhaust gas recycle and oxygen-containing gas flow can then be compressed (such as in the main compressor for a natural gas turbine) prior to entering a combustion chamber, where it is mixed with fuel for combustion. In other aspects, other configurations can be used for compressing the various gas flows prior to entering the combustion chamber.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having a molar ratio of combustion fuel to oxygen ranging from about plus or minus 10% of the oxygen required for a stoichiometric ratio or more preferably from about plus or minus 5% of the oxygen required for the stoichiometric ratio. For example, the stoichiometric ratio of fuel to oxygen for methane is 1:2 ($CH_4+2O_2>CO_2+2H_2O$). Propane will have a stoichiometric ratio of fuel to oxygen of 1:5. Another way of measuring substantially stoichiometric combustion is as a ratio of oxygen supplied to oxygen required for stoichiometric combustion, such as from about 0.9:1 to about 1.1:1, or more preferably from about 0.95:1 to about 1.05:1.

Post-Combustion Capture Stage

A variety of options are available for the post-combustion capture stage. In some aspects, a plurality of different types of post-combustion capture devices can be used to form a $CO_2$-containing stream that contains a target amount of the $CO_2$ generated in the combustion zone and/or in any supplemental combustion device.

One option for a post-combustion capture stage is to use one or more aqueous amine separators, or amine scrubbers. By using a combination of oxygen-enriched combustion and exhaust gas recycle, the size of the amine scrubber(s) used for post-combustion capture can be substantially reduced. Optionally, in aspects where an amine scrubber is used as at least a portion of the post-combustion capture stage, the combustion zone can be operated at substantially stoichiometric conditions and/or a supplemental combustion stage can be used to reduce or minimize the amount of oxygen that is passed into the amine scrubber(s).

Another option for a post-combustion capture stage is to use a liquid phase capture device that operates by providing a high interfacial gas-liquid mass transfer surface area. The liquid in the device can include one or more components (such as amines) that perform sorption of $CO_2$. Examples of devices that can provide a high interfacial gas-liquid mass transfer surface area in a post-combustion capture stage include, but are not limited to, devices that increase surface area based on centrifugal shearing of a liquid; devices that increase surface area by generating small liquid droplets that can be dispersed into a gas stream; and devices that increase surface area by generating a thin film of liquid that is in contact with the gas stream. Optionally, in aspects where the liquid phase sorbent is based at least in part on an amine, the combustion zone can be operated at substantially stoichiometric conditions and/or a supplemental combustion stage can be used to reduce or minimize the amount of oxygen that is passed into post-combustion capture stage.

Still another option for a post-combustion capture stage is to use a solid sorbent. A variety of solid sorbent systems are available. Solid sorbents can include sorbents that are supported on a support material, such as a sorbent supported on a monolith or a sorbent supported on particles in a sorbent bed. Other types of solid sorbents can be formed into a monolith, particles, or another convenient structure without use of a support material. Examples of solid sorbents can include, but are not limited to, zeotypes, metal organic framework materials, and aminopolymers. The method for recovering the $CO_2$ after sorption on the solid sorbent can vary depending on the nature of the sorbent. In some aspects, a direct displacement method can be used. For example, after sorption of $CO_2$ by a solid sorbent, low pressure steam can be used to displace the $CO_2$ and regenerate the sorbent for further use. As another example, temperature swings can be used to allow a sorbent to transition for conditions for sorption of $CO_2$ to conditions for desorption of $CO_2$. Still another example can be to use a sorbent where swings in pressure allow for a sorbent to transition from conditions for sorption of $CO_2$ to conditions for desorption of $CO_2$. Yet another example can be to use a combination of two or more of direct displacement, temperature swings, and pressure swings to allow a sorbent to transition from conditions for sorption of $CO_2$ to conditions for desorption of $CO_2$. Optionally, in aspects where the solid sorbent is based at least in part on an amine, the combustion zone can be operated at substantially stoichiometric conditions and/or a supplemental combustion stage can be used to reduce or minimize the amount of oxygen that is passed into post-combustion capture stage.

It is noted that having a higher $CO_2$ concentration in a combustion exhaust can provide additional benefits for a post-combustion capture stage based on a solid sorbent. For many types of solid sorbents, the equilibrium sorption capacity of the sorbent is dependent on the available concentration of $CO_2$ in the input gas flow to the sorbent environment. Thus, the productivity of such a sorbent ($CO_2$ captured per mass of sorbent per unit time) is increased when performing $CO_2$ capture on a higher concentration stream.

Yet another option for a post-combustion capture stage is to use a molten carbonate fuel cell. Molten carbonate fuel cells operate by using converting $CO_2$ and $O_2$ in the cathode into carbonate ions for transport across the electrolyte in the fuel cell. The carbonate is combined with hydrogen in the anode to form $CO_2$ and $H_2O$ while also generating electrical power. To use a molten carbonate fuel cell as a post-combustion capture device, the flue gas (combustion exhaust) from the combustion zone of the turbine is used as at least a portion of the cathode input flow to the fuel cell. It is noted that $O_2$ is also a required reactant for operation of the cathode of a molten carbonate fuel cell. Thus, the presence of additional oxygen in the combustion exhaust is potentially beneficial for increasing the $CO_2$ utilization in the cathode while maintaining stable operating conditions.

Because $CO_2$ is used to form the ion that is transported across the electrolyte, molten carbonate fuel cells provide the unusual property of allowing $CO_2$ to be transferred from a lower concentration cathode stream to a higher concentration anode stream. Due to the nature of the electrochemical reaction in a molten carbonate fuel cell, achieving capture of 80 vol % or more of the $CO_2$ in a cathode input stream (i.e., a $CO_2$ utilization of 80 vol % or more) can be difficult when the $CO_2$ concentration in the cathode input flow is roughly 5.0 vol % or less. However, by using oxygen-enriched combustion and/or exhaust gas recycle to increase the $CO_2$ concentration in the combustion exhaust, 80 vol % or more of the $CO_2$ in the cathode input flow can be captured (via transfer to the anode exhaust), or 90 vol % or more can be captured, while still having a cathode exhaust with a $CO_2$ content of 1.0 vol % or more, or 1.5 vol % or more, or 2.0 vol % or more, such as up to 5.0 vol %. In some aspects, maintaining a $CO_2$ concentration of 1.5 vol % or more (or 2.0 vol % or more) in the cathode exhaust can assist with stable operation of a molten carbonate fuel cell, as this increases the likelihood that substantial amounts of $CO_2$ are present throughout the cathode, as opposed to having portions of the cathode where $CO_2$ is substantially depleted during operation.

Still another option for a post-combustion capture stage is to use a membrane separator. Membrane systems are commercially available (such as polymeric membranes) that can provide a separation factor of roughly 50 for separation of $CO_2$ from $N_2$. In combination with using a reduced pressure on the permeate side/an increased pressure on the retentate side to provide driving force, such membranes can be used to perform a separation on a flue gas having a $CO_2$ content of 12 vol % or higher to produce a permeate stream. By using a membrane separation for $CO_2$ capture, the thermal costs for regenerating a sorbent can be avoided and replaced with the lower cost of maintaining a pressure differential across the membrane. In addition to the direct cost savings by avoiding the need for heating and cooling, such thermal costs can include, but are not limited to, avoiding the need for a stripper/reboiler unit, avoiding the need for additional heat exchangers, avoiding any emissions associated with generating heat, and avoiding the losses that are incurred when heating and cooling various fluids to perform heat exchange.

Yet another option for post-combustion capture is to use cryogenic separation. During cryogenic separation, $CO_2$ is separated from gases such as $N_2$ or $O_2$ by reducing the temperature and/or increasing the pressure by a sufficient amount so that the $CO_2$ forms a condensed phase while the other components remain in the gas phase. It is noted that combustion exhausts typically contain a substantial amount of water. Such water is removed prior to exposing the stream to full cyrogenic conditions, such as by condensing the water under conditions where the $CO_2$ remains in the gas phase.

It is noted that a post-combustion capture stage can optionally include multiple devices of a given type, and/or can include a mixture of types of post-combustion capture devices. For example, if desired, a plurality of membranes, solids sorbents, and/or molten carbonate fuel cells can be arranged in series to achieve a $CO_2$-containing product stream that has a target purity of $CO_2$.

COMBINED CYCLE PROCESS—CONFIGURATION EXAMPLES

In various aspects, systems and methods are provided for generating power while controlling and/or capturing the emissions produced during power generation. One goal of power generation is to use input feeds (such as fuels) as efficiently as possible, so that power generation is increased for a given amount of fuel and/or amount of equipment. Based on the conditions for effective power generation, a goal for control and/or capture of emissions can be to provide effective capture of emissions while reducing or minimizing the changes to the conditions for power generation.

In various aspects, the processes described herein can be used to produce electric power while substantially capturing the $CO_2$ generated during the process, such as capturing 70 vol % or more of the $CO_2$ in the exhaust flue gas from the combustion process, or 80 vol % or more, or 90 vol % or more (such as up to capturing substantially all of the $CO_2$ in the combustion exhaust). In one or more aspects, a mixture of enriched air and fuel can be combusted. Prior to and/or during combustion, a recycle portion of the exhaust gas can be added to the mixture. In some aspects, the exhaust gas recycle can correspond to a portion of the total exhaust, so that the recycle stream generally includes the products of the combustion reaction. This includes $CO_2$, $H_2O$, and diluent gases present in the combustion environment such as $N_2$. In other aspects, a selective exhaust gas recycle stream can be used that has a $CO_2$ content of 80 vol % or more, or 90 vol % or more. The exhaust gas recycle can be used as a diluent to control, adjust, or otherwise moderate the temperature of combustion and the exhaust that enters the succeeding expander. Additionally, the exhaust gas recycle can further increase the $CO_2$ content of the resulting flue gas formed by combustion. The combination of using enriched air and recycled exhaust gas can allow the expander to operate at higher expansion ratios for the same inlet and discharge temperatures, thereby producing increased power.

In various aspects, any convenient ratio of oxygen to fuel can be used. For example, when using natural gas as the fuel, the molar ratio of $O_2$ to fuel can range from roughly 2.0:1 (substantially stoichiometric combustion) to 5.0:1, or possibly still higher. As another example, the molar ratio of $O_2$ to fuel can range from roughly 2.0:1 to 3.5:1, or 2.0:1 to 3.0:1. It is noted that if a fuel other than methane is used, lower values of $O_2$ to fuel will correspond to substantially stoichiometric combustion, such as a ratio of roughly 1.5:1. In such aspects, the ratio of $O_2$ to fuel can range from roughly 1.5:1 to 3.5:1.

It is noted that combustion in commercial gas turbines at stoichiometric conditions or substantially stoichiometric conditions (e.g., "slightly rich" combustion) can prove advantageous in order to eliminate the cost of excess oxygen removal. Such operation can also reduce the amount of $N_2$ present in the combustion exhaust. By cooling the exhaust and condensing the water out of the cooled exhaust stream, a relatively high content $CO_2$ exhaust stream can be produced. While a portion of the recycled exhaust gas can be utilized for temperature moderation in a closed Brayton cycle, a remaining purge stream can be used for EOR applications and/or electric power can be produced with little or no sulfur oxides ($SO_x$), nitrogen oxides (NOx), and/or $CO_2$ being emitted to the atmosphere. The result of this process is the production of power in three separate cycles and the manufacturing of additional $CO_2$. In some aspects, performing stoichiometric combustion allows for generation of an exhaust stream that consists substantially of $CO_2$, $H_2O$, and $N_2$. An exhaust stream that consists substantially of $CO_2$, $H_2O$, and $N_2$ is defined as an exhaust stream that contains about 5 mole % or less of other gas molecules, such as about 2.5 mole % or less of other gas molecules, or about 1 mole % or less of other gas molecules.

In some aspects, such as some aspects where substantially stoichiometric combustion is not performed, a duct burner and/or other supplemental combustion stage can be used to reduce the oxygen content of the combustion exhaust. Such a supplemental combustion stage can operate by adding additional fuel to the combustion exhaust and then consuming a substantial portion of the oxygen present in the combustion exhaust via a supplemental combustion reaction.

Figure 3:
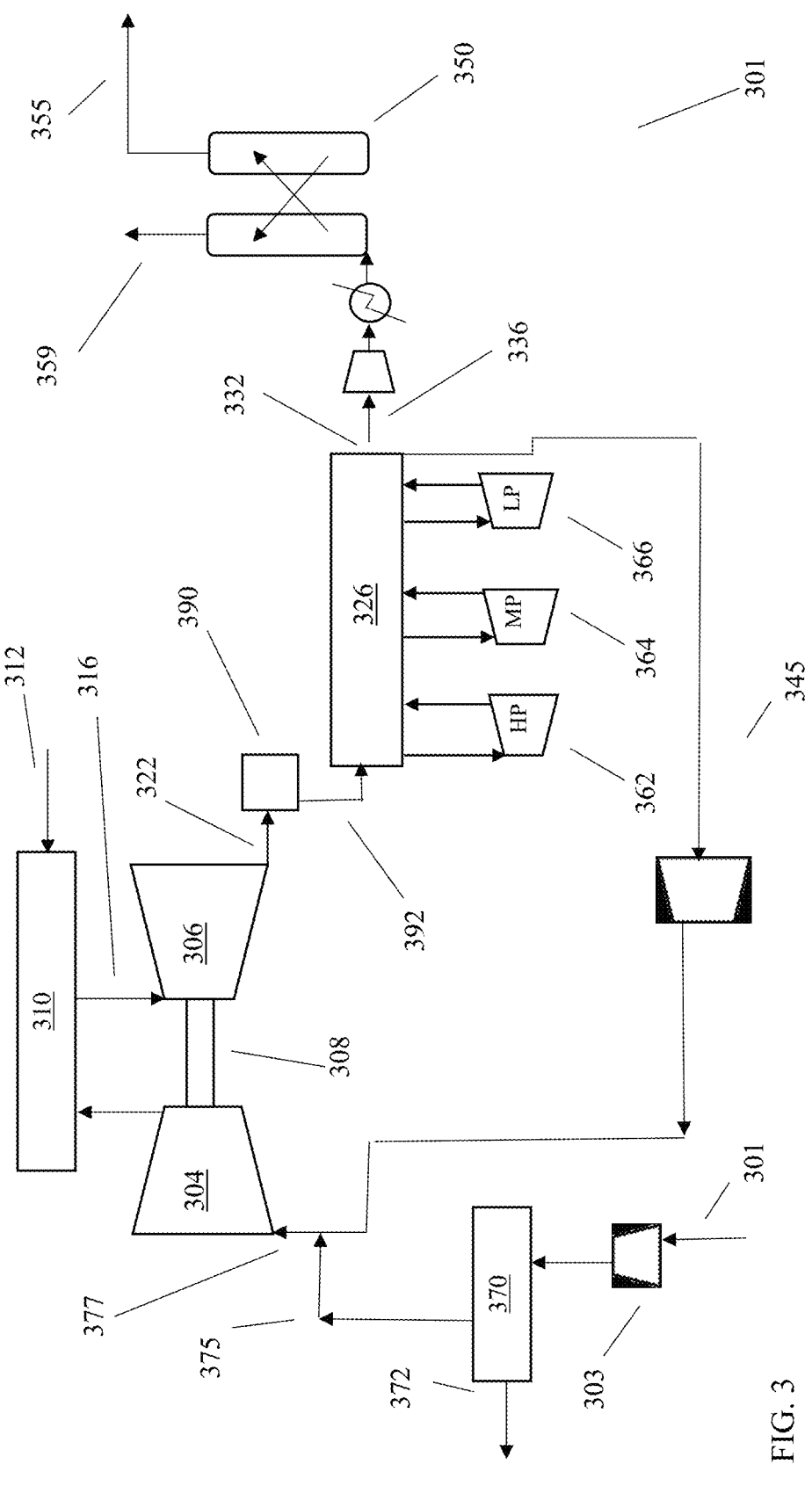
FIG. 3 shows an example of a configuration for a combined cycle power plant that uses enhanced oxygen combustion and exhaust gas recycle.

FIG. 3 shows an example of an integrated system for power generation and $CO_2$ capture using a combined-cycle arrangement that includes oxygen-enhanced combustion and exhaust gas recycle. Although FIG. 3 shows a natural gas combined cycle plant, any other convenient type of combustion-based combined cycle power plant could be used, such as power plants based on combustion of propane, fuel oil, coal, kerosene.

In some aspects, the power generation system can include a gas turbine system characterized as a power-producing, closed Brayton cycle. The gas turbine system can have a first or main compressor 304 coupled to an expander 306 via a shaft 308. The shaft 308 can be any mechanical, electrical, or other power coupling, thereby allowing a portion of the mechanical energy generated by the expander 306 to drive the main compressor 304. In at least one aspect, the gas turbine system can be a standard gas turbine, where the main compressor 304 and expander 306 form the compressor and expander ends, respectively. In other aspects, the main compressor 304 and expander 306 can be individualized components.

In various aspects, the gas turbine system can also include an integrated pressure swing adsorption system 370. The pressure swing adsorption system can optionally correspond to a vacuum pressure swing adsorption system. In the example configuration shown in FIG. 3, air 301 is compressed 303 prior to being passed into pressure swing adsorption system 370 to form a nitrogen-containing stream 372 with an $N_2$ content of 95 vol % or more and an oxygen-containing stream 375 with an $O_2$ content of 25 vol % to 48 vol %. The oxygen-containing stream 375 is then combined with exhaust gas recycle 345 (after any optional compression) prior to passing the combined stream 377 into main compressor 304.

Combustion chamber 310 combusts fuel 312 with the combined stream 377. In one or more aspects, the fuel in line 312 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof.

An exhaust gas 316 directed to the inlet of the expander 306 can be generated as a product of combustion in combustion chamber 310. As the exhaust gas in line 316 expands through the expander 306 it generates mechanical power to drive the main compressor 304, an electrical generator, and/or other facilities, and also produces a gaseous exhaust 322 having a heightened $CO_2$ content. In some aspects the expander 306 may be adapted to produce additional mechanical power that may be used for other purposes.

The power generation system can also include a heat recovery steam generator (HRSG) 326, or similar device. The gaseous exhaust 322 can be passed into HRSG 326, where the gaseous exhaust is used to raise steam. The HRSG 326 can be coupled with one or more steam turbines. In the example shown in FIG. 3, the HRSG 326 is fluidly coupled with high pressure steam turbine 362, medium pressure steam turbine 364, and low pressure steam turbine 366. In other aspects, any convenient number of steam turbines can be fluidly coupled to the HRSG 326.

Optionally, prior to passing gaseous exhaust 322 into the HRSG 326, an optional duct burner 390 can be used to combust any remaining oxygen present in gaseous exhaust 322. This is achieved by adding extra fuel (not shown) to the duct burner to allow substantially all of the remaining oxygen in the gaseous exhaust 322 to be consumed by a combustion reaction. This generates additional heat along with a duct burner exhaust stream 392 that contains 2.0 vol % or less of $O_2$, or 1.0 vol % or less, or 0.1 vol % or less, such as down to having substantially no $O_2$ content. The additional heat generated by the combustion reaction in the optional duct burner 390 can also be recovered in HRSG 326.

After passing through HRSG 326, one portion of the resulting cooled exhaust gas 332 can be used as an exhaust gas recycle stream 345. A blower 344 can be used to restore any pressure lost due to pressure drop across the HRSG 326 prior to combining exhaust gas recycle stream 345 with oxygen-containing stream 375. In some aspects, after optional compression, the exhaust gas recycle 345 can have a pressure between 95 kPa-a and 115 kPa-a.

The remaining portion 336 of the cooled exhaust gas 332 can be passed into one or more stages for capture of $CO_2$. In this example, $CO_2$ capture is performed using one or more amine scrubber stages 350. Because the $CO_2$ content of the cooled exhaust gas 332 is 12 vol % or more, or 15 vol % or more, or 20 vol % or more, the size of the amine scrubber stage(s) is substantially smaller than would be required for capturing the same amount of $CO_2$ at a concentration between 4.0 vol % and 8.0 vol %. Optionally, one or more temperature and/or pressure adjustment stages 351 (such as compressors and heat exchangers) can be used to modify the temperature and pressure of the portion 336 of cooled exhaust gas 332 prior to passing the portion 336 into the amine scrubber(s) 350. The amine scrubbers produce a flue gas 359 with a reduced $CO_2$ concentration, and a high purity $CO_2$ output flow 355 that contains 90 vol % or more of the $CO_2$ from the portion 336 of the cooled exhaust gas 332 that is passed into the amine scrubber(s) 350. The flue gas 359 can have a $CO_2$ concentration of 3.0 vol % or less, or 2.0 vol % or less, or 1.0 vol % or less, such as down to having substantially no $CO_2$ content (0.1 vol % or less). Because an amine scrubber is used in the example configuration shown in FIG. 3, $CO_2$ output flow 355 can also contain water. Such water can subsequently be removed by cooling the $CO_2$ output flow 355 (not shown). After water removal, the $CO_2$ output flow can contain 80 vol % or more of $CO_2$, or 90 vol % or more. The $CO_2$ output flow can include 80 vol % or more of the $CO_2$ in gaseous exhaust 322, or 90 vol % or more.

Figure 4:
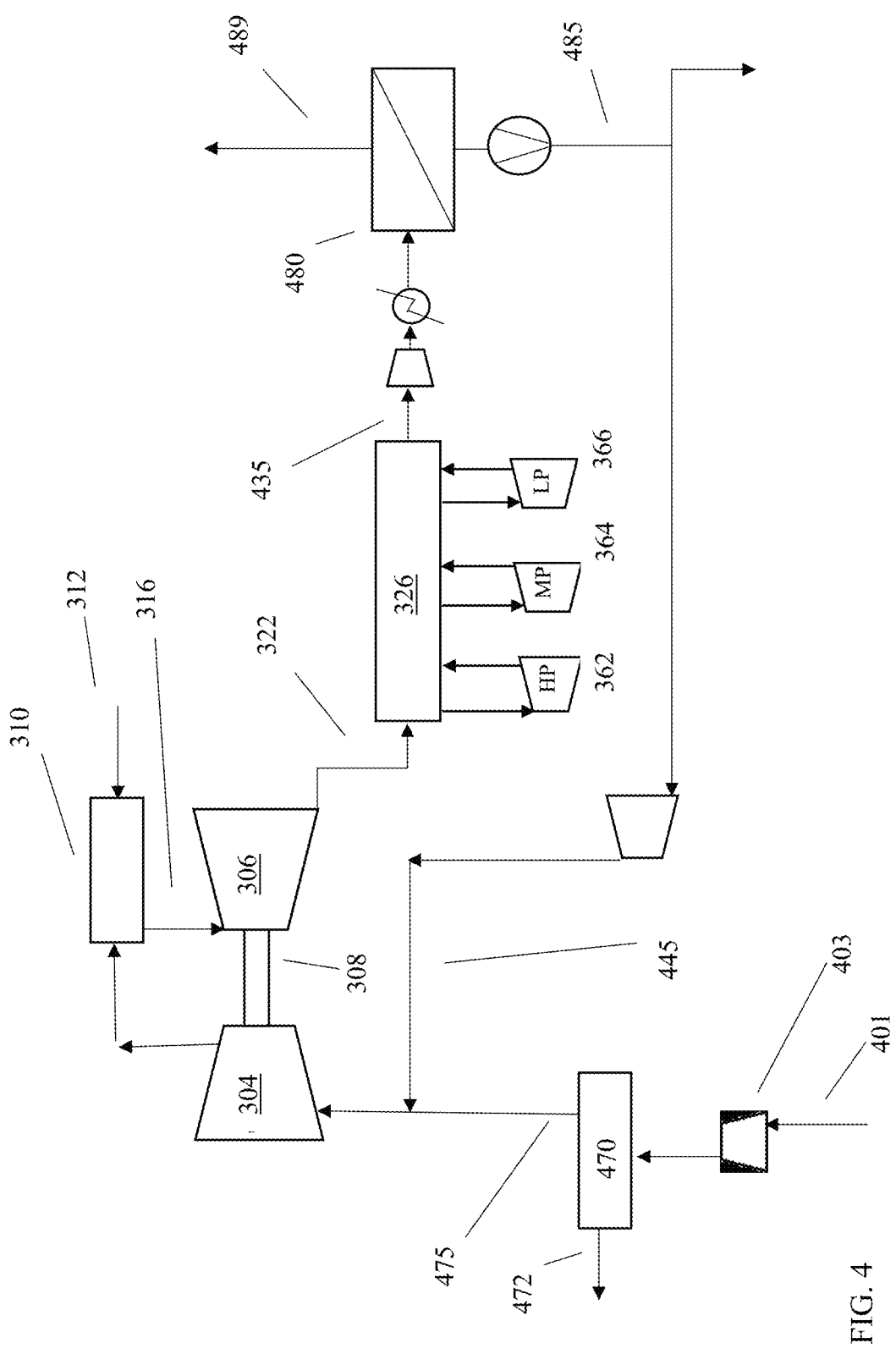
FIG. 4 shows an example of a configuration for a combined cycle power plant that uses enhanced oxygen combustion, selective exhaust gas recycle, and a membrane stage for separating $CO_2$ from flue gas.

FIG. 4 shows another combined cycle configuration. In the example shown in FIG. 4, the pressure swing adsorption process corresponds to a vacuum pressure swing adsorption process. Additionally, the exhaust gas recycle in the configuration shown in FIG. 4 corresponds to a selective exhaust gas recycle, where the recycle stream corresponds to a portion of the high purity $CO_2$ formed after separation from the flue gas. When using the additional oxygen that can be provided by vacuum pressure swing adsorption and/or when using selective exhaust gas recycle, the $CO_2$ content of the flue gas from combustion can be high enough to allow for alternative methods of separation, such as the membrane system used in the example configuration shown in FIG. 4.

In FIG. 4, air 401 is compressed 403 and then passed into a vacuum pressure swing adsorption stage 470. This produces a high purity nitrogen stream 472 and an oxygen-containing stream 475 containing 30 vol % to 48 vol % of $O_2$, or 35 vol % to 48 vol %. The oxygen-containing stream 475 is combined with selective exhaust gas recycle stream 445 prior to being passed into main compressor 304. The combined mixture is then combusted 310 with fuel 312. The selective exhaust gas recycle stream 445 corresponds to a $CO_2$ stream containing 90 vol % or more of $CO_2$.

By using a higher $O_2$ content oxygen-containing stream and/or a selective exhaust gas recycle stream 445, a higher $CO_2$ content exhaust gas 435 exits from the HRSG 326. Based on the higher $CO_2$ content, a membrane 480 can be used to generate a permeate stream 485 that contains 90 vol % or more $CO_2$. Additionally or alternately, the $CO_2$ in the permeate can correspond to 90 vol % or more of the $CO_2$ originally generated by the combustion reaction in combustion chamber 310. The membrane separation also generates a retentate 489 corresponding to a low $CO_2$ content flue gas.

Example 1—Oxygen Enrichment Via Pressure Swing Adsorption

A kinetic model was used to determine separation performance for two types of sorbents in a pressure swing adsorption apparatus. Table 3 shows the kinetic parameters used to model the performance of a carbon molecular sieve (CMS) sorbent and a sorbent based on ITQ-55. The parameters for CMS were taken from Qinglin et al., "Revisiting Transport of Gases in the Micropores of Carbon Molecular Sieves" Langmuir (2003) 19, 393-405. The parameters for ITQ-55 were derived based on diffusivity measurements obtained using a pressure-swing frequency response apparatus.

TABLE 3

| Kinetic Parameters for Sorbents | | | |
| --- | --- | --- | --- |
| Adsorbent | Sorbate | $(D/r^2)_{0, i}$ (1/s) | $\Delta E_{D, i}$ (J/mol) |
| ITQ-55 | Oxygen | 19.61 | 25965 |
| | Nitrogen | 9.88 | 15937 |
| CMS | Oxygen | 31.75 | 28971 |
| | Nitrogen | 7.07 | 18500 |

Based on the kinetic parameters in Table 3, a pressure swing adsorption system was modeled for kinetic separation of air using either ITQ-55 or CMS as the sorbent. A two bed configuration similar to the example configuration discussed in FIG. 1 was used to model the kinetic separation. The single adsorption bed has a dimension of 1.5 meters (diameter)×2 meters (length) with bed voidage 0.4 for adsorbent forming in pellets. For the separation in Example 1, the eight step process described in association with Table 1 was used. Table 4 shows details regarding the composition and flow rates in the modeled separation process. The target for this modeled process was to generate an oxygen-containing flow with an $O_2$ concentration of roughly 30 vol % with high recovery, while also producing a high purity $N_2$ flow. For the separation in Example 1, Step 1, Step 2, Step 5, and Step 6 are 10 seconds long; Step 3 and Step 7 are 2.0 seconds long; and Step 4 and Step 8 are 0.5 seconds long.

TABLE 4

| | | | Flows of Pressure Swing Adsorption Process | | | |
|---|---|---|---|---|---|---|
| | | Pressure | Mole fraction (—) | | Moles | Flowrate |
| Adsorbent | Streams | (bar) | Oxygen | Nitrogen | (kmol) | (m³/s) |
| ITQ-55 | Feed + Pressurization | 4.5 | 0.21 | 0.79 | 0.790 | 0.330 |
| | Raffinate product | 4.5 | 0.0197 | 0.9803 | 0.235 | 0.099 |
| | Extracted product | 1.013 | 0.3018 | 0.6982 | 0.534 | 0.223 |
| CMS | Feed + Pressurization | 4.5 | 0.21 | 0.79 | 0.779 | 0.326 |
| | Raffinate product | 4.5 | 0.0487 | 0.9513 | 0.264 | 0.110 |
| | Extracted product | 1.013 | 0.3016 | 0.6984 | 0.492 | 0.205 |

In Table 4, the "Feed+Pressurization" row corresponds to the input flow for Step 1 and Step 7 of the process. The "Raffinate product" corresponds to the net adsorption effluent generated in Step 1, after subtracting out the portion of the adsorption effluent that was used in Step 5 (second purge step). The "Extracted product" corresponds to the first purge exhaust formed in Step 4. As shown in Table 4, both ITQ-55 and CMS were suitable as sorbents for forming a nitrogen-containing product with an $N_2$ concentration of 95 vol % or higher; and for forming an oxygen-containing product with an $O_2$ concentration of roughly 30 vol %.

Table 5 shows additional details related to the purity, flow rate, and productivity for the modeled process in Table 4.

TABLE 5

| | Products from Pressure Swing Adsorption Process | | | | | | | |
|---|---|---|---|---|---|---|---|---|
| | Extracted product ($O_2$ enrichment) | | | | Raffinate product ($N_2$ product) | | | |
| Adsorbent | $O_2$ purity (%) | $O_2$ recovery (%) | Flow (ton/day) | Productivity (ton/day/ m³ bed) | $N_2$ purity (%) | $N_2$ recovery (%) | Flow (ton/day) | Productivity (ton/day/ m³ bed) |
| ITQ-55 | 30.18 | 97.13 | 29.95 | 4.24 | 98.03 | 36.91 | 12.67 | 1.79 |
| CMS | 30.16 | 90.65 | 27.58 | 3.90 | 95.13 | 40.81 | 14.29 | 2.02 |

As shown in Table 5, roughly 90 vol % or more of the $O_2$ passed into the adsorbent beds during the pressurization and adsorption steps is successfully recovered as part of the oxygen-containing gas. The nitrogen recovery is lower, corresponding to 35 vol % to 40 vol % of the $N_2$ passed into the bed during the pressurization and adsorption steps.

Example 2—Oxygen Enrichment Via Vacuum Pressure Swing Adsorption

The same kinetic model was used to model a vacuum pressure swing adsorption process with a target of producing an oxygen-containing stream having an $O_2$ concentration of roughly 40 vol %. The six step process described in association with Table 2 was used for the process flows. Table 6 shows details regarding the composition and flow rates in the modeled VPSA process. The total cycle time is 45 sec, with adsorption/desorption times of 20 seconds each; blowdown/repressurization times of 0.5 seconds each; and an equalization time of 2 seconds per equalization.

TABLE 6

| | | | Flows of Vacuum Pressure Swing Adsorption Process | | | |
|---|---|---|---|---|---|---|
| | | Pressure | Mole fraction (—) | | Moles | Flowrate |
| Adsorbent | Streams | (bar) | Oxygen | Nitrogen | (kmol) | (sm³/s) |
| ITQ-55 | Feed + Pressurization | 4.5 | 0.21 | 0.79 | 0.935 | 0.380 |
| | Blowdown | 1.013 | 0.0335 | 0.9665 | 0.149 | 0.061 |
| | Raffinate product | 4.5 | 0.0078 | 0.9922 | 0.308 | 0.125 |

TABLE 6-continued

| | | | Flows of Vacuum Pressure Swing Adsorption Process | | | |
|---|---|---|---|---|---|---|
| | | Pressure | Mole fraction (—) | | Moles | Flowrate |
| Adsorbent | Streams | (bar) | Oxygen | Nitrogen | (kmol) | (sm³/s) |
| | Extracted product (O₂ enrichment) | 0.1 | 0.4016 | 0.5984 | 0.477 | 0.194 |
| CMS | Feed + Pressurization | 4.5 | 0.21 | 0.79 | 0.752 | 0.284 |
| | Blowdown | 1.013 | 0.0644 | 0.9356 | 0.149 | 0.056 |
| | Raffinate product | 4.5 | 0.0202 | 0.9798 | 0.248 | 0.094 |
| | Extracted product (O₂ enrichment) | 0.1 | 0.4013 | 0.5987 | 0.358 | 0.135 |

In Table 6, the "Feed+Pressurization" row corresponds to the input flow for Step 1 and Step 6 of the process. The "Raffinate product" corresponds to the net adsorption effluent generated in Step 1. The "Blowdown exhaust" corresponds to the outflow during step 3 of the process. The "Extracted product" corresponds to the vacuum purge exhaust formed in Step 4. In the model process illustrated by Table 6, the vacuum purge was performed by reducing the pressure in the sorbent environment to 10 kPa-a. As shown in Table 6, both ITQ-55 and CMS were suitable as sorbents for forming a nitrogen-containing product with an $N_2$ concentration of 97 vol % or higher; and for forming an oxygen-containing product with an $O_2$ concentration of roughly 40 vol %.

Table 7 shows additional details related to the purity, flow rate, and productivity for the modeled process in Table 6.

TABLE 7

| | Products from Vacuum Pressure Swing Adsorption Process | | | | | | | |
|---|---|---|---|---|---|---|---|---|
| | Extracted product (O₂ enrichment) | | | | Raffinate product (N₂ product) | | | |
| Adsorbent | O₂ purity (%) | O₂ recovery (%) | Flow (T/D) | Productivity (T/D/ m³ bed) | N₂ purity (%) | N₂ recovery (%) | Flow (T/D) | Productivity (T/D/ m³ bed) |
| ITQ-55 | 40.16 | 97.64 | 27.14 | 3.84 | 99.22 | 41.41 | 16.58 | 2.35 |
| CMS | 40.13 | 90.82 | 20.33 | 2.88 | 97.98 | 40.94 | 13.37 | 1.89 |

As shown in Table 7, roughly 90 vol % or more of the $O_2$ passed into the adsorbent beds during the pressurization and adsorption steps is successfully recovered as part of the oxygen-containing gas. The nitrogen recovery is lower, corresponding to roughly 40 vol % of the $N_2$ passed into the bed during the pressurization and adsorption steps.

Example 3—Combined Cycle Operation Example with PSA and EGR

Figure 5:
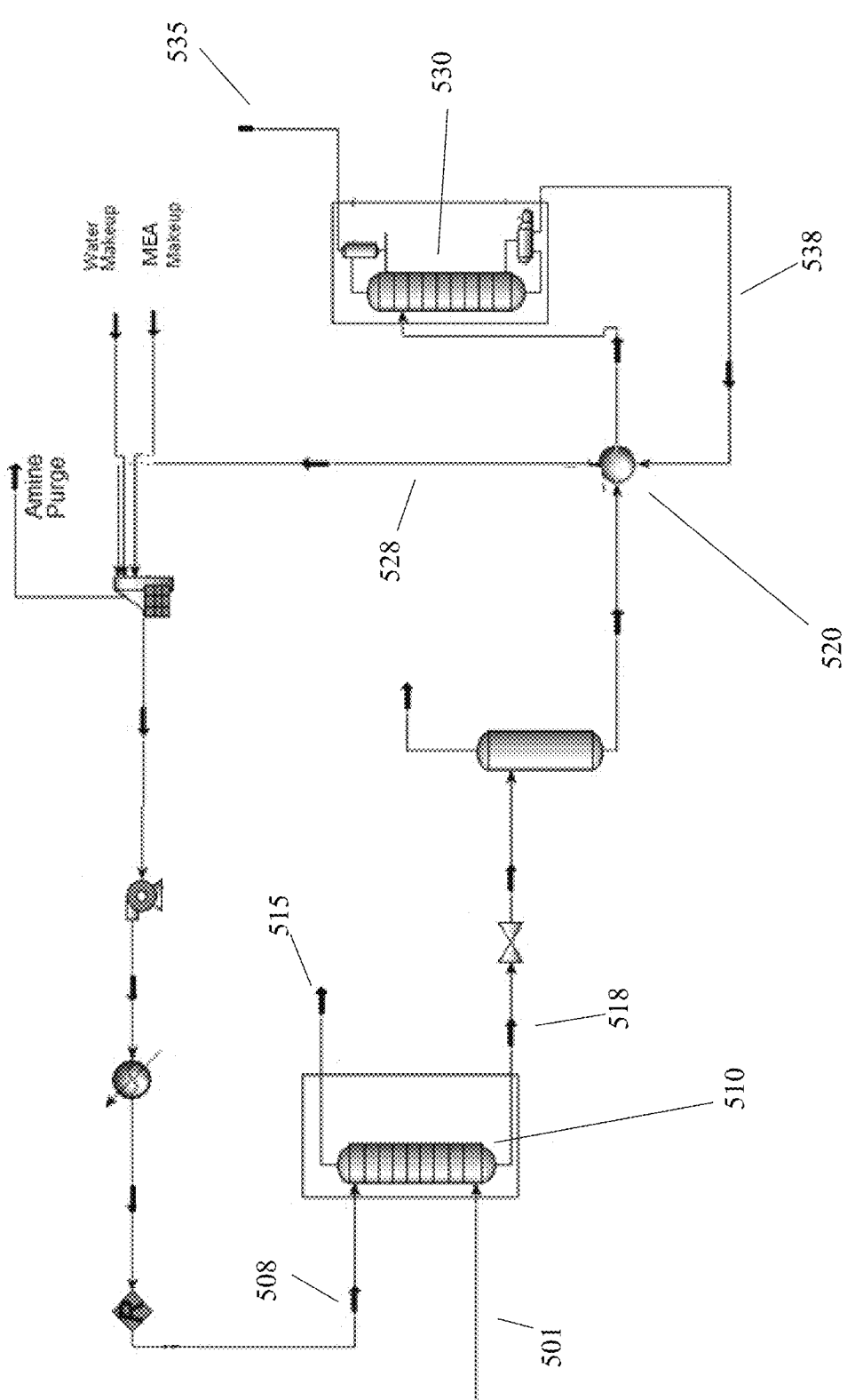
FIG. 5 shows a modeled configuration for an amine scrubber.

To illustrate the benefits for carbon capture from operating with enriched oxygen combustion and exhaust gas recycle, operation of an amine scrubber for capturing $CO_2$ from a flue gas was modeled using a commercially available software package (Aspen HYSYS®). The amine scrubber was modeled based on use of monoethanolamine (MEA) as the sorbent. FIG. 5 shows the configuration that was modeled.

The modeled configuration was used to investigate capture of $CO_2$ from three different types of model flue gases. A first flue gas corresponded to a flue gas generated using air as the oxygen-containing gas (~21 vol % $O_2$) and without exhaust gas recycle. The corresponding flue gas had a $CO_2$ concentration of only 4.0 vol %. A second flue gas corresponded to a flue gas generated by using an oxygen-containing gas containing 30 vol % $O_2$, along with performing some exhaust gas recycle (roughly 43 vol % of the flue gas exiting from the HRSG). This flue gas was modeled as having a $CO_2$ content of 13 vol %. The third flue gas was modeled as having a $CO_2$ content of 16 vol %, based on a combination of exhaust gas recycle (55 vol % of flue gas exiting from the HRSG) and using an oxygen-containing gas containing 40 vol % $O_2$.

In the process model, flue gas 501 enters the absorber at 1.1 bar pressure (110 kPa-a) and 40° C. temperature. The lean amine (28 wt % MEA in water) is also fed to the absorber 510. The "green flue gas" 515 leaves the absorber at the top while the $CO_2$-rich amine 518 leaves the absorber 510 from the bottom. It then goes to a lean/rich heat exchanger 520 where it is heated by the lean amine 538 leaving the stripper 530. The heated rich amine 528 is fed to the stripper 530, where high-purity $CO_2$ (>94%) 535 leaves at the top of the stripper. The stripper reboiler duty is provided by LP steam from the HRSG (not shown). By calculating the flow rate of steam required, the power debit for the amine unit reboiler can be calculated.

The simulation results for the base case (21% $O_2$ in inlet air and no EGR) and the two cases using oxygen-enriched combustion with exhaust gas recycle are shown in Table 8. Due to the use of higher $O_2$ concentration air and flue gas recycle, the concentration of $CO_2$ in flue gas is significantly higher for the oxygen-enriched combustion cases compared to the base case. Consequently, there is a reduction in the total flowrate of flue gas that needs to be sent to the capture unit. There is a 71% reduction in total flue gas flowrate, compared to the base case, for the case using 30 vol % $O_2$ in the oxygen-containing gas. This increases to more than 75% reduction for the case involving 40 vol % $O_2$ in the oxygen-containing gas. This results in significant savings in the compressor and cooler duties. In addition, due to lower amount of amine inventory required for the oxygen-enhanced combustion cases, the reboiler duty and hence the LP power debit is lower. The overall power debit for carbon capture is thus significantly lower for the oxygen-enhanced combustion cases. The efficiency debit for the oxygen-enhanced combustion cases is only ~5% while it is 11.5% for the base case. This constitutes a significant energy savings for the NGCC power plant.

The other observation from Table 8 is that there is a 20% reduction in the number of absorber stages required to achieve 90% $CO_2$ capture in the OEC cases compared to the base case. For the base case, the absorber size required is 80 m height and 20 m diameter. For the case using 40 vol % $O_2$ in the oxygen-containing gas, the absorber is estimated to be 60 m height and 10 m diameter. This allows for significant intensification of the capture unit.

TABLE 8

Simulation Results for Base case and Selected OEC Cases using Aspen Hysys for Amine Unit

| | Base Case | With OEC + EGR | | | |
|---|---|---|---|---|---|
| $O_2$ concentration in inlet air (mol %) | 21% | 30% | 40% | 60% | 80% |
| Total NGCC power w/o CC (MW) | 354.5 | 354.5 | 354.5 | 354.5 | 354.5 |
| Efficiency w/o CC | 58.4 | 60.0 | 60.6 | 61.1 | 58.0 |
| Efficiency w/CC | 46.9 | 54.7 | 55.8 | 56.6 | 53.9 |
| Flue gas mass flowrate (kg/s) | 532.8 | 152.7 | 115.9 | 85.33 | 67.07 |
| Flue gas $CO_2$ mol % | 3.93 | 13.0 | 16.7 | 23.1 | 28.1 |
| No. of absorber/stripper stages | 250 | 200 | 200 | 200 | 200 |
| Lean amine flowrate (kg/s) | 381 | 272 | 272 | 297 | 307 |
| $CO_2$ capture % | 90.9 | 89.5 | 90.3 | 90.3 | 90.3 |
| Flue compressor power (MW) | 5.8 | 1.7 | 1.3 | 0.96 | 0.77 |
| Flue gas cooler duty (MW) | 43.6 | 13.1 | 9.9 | 7.3 | 6.1 |
| LP power debit (MW) | 20.5 | 16.3 | 16.8 | 18.0 | 18.2 |
| Total CC power debit (MW) | 69.9 | 31.1 | 27.9 | 26.2 | 25.1 |

Example 4—$CO_2$ Separation Via Membrane

In aspects where the $CO_2$ content of the flue gas is increased to 15 vol % or more, a membrane system can be used in place of an amine scrubber while still producing a $CO_2$-containing stream with a $CO_2$ content of 90 vol % or more. Additionally, in such aspects, the membrane can allow for capture of 90 vol % or more of the $CO_2$ in the flue gas.

To illustrate the potential use of a membrane for carbon capture, a polymeric membrane with a $CO_2$ permeance of 1000 GPU and $CO_2/N_2$ separation factor of 50 can be used as a model membrane. Polymeric membranes with such characteristics are currently commercially available, such as some membranes available from Membrane Technology and Research of Newark, CA. Table 9 shows the impact of membrane feed $CO_2$ concentration on the permeate $CO_2$ concentration when using a membrane having these characteristics. As shown in Table 9, at a flue gas concentration of 16% $CO_2$, a membrane having the above characteristics can be used to generate a permeate stream containing greater than 90 vol % $CO_2$. It is noted that if higher purities are required, a second membrane stage can be used or the membrane can be coupled with another capture unit such as a PSA.

TABLE 9

Membrane Performance

| Membrane Feed $CO_2$ concentration (mol %) | Membrane Permeate $CO_2$ concentration (mol %) |
|---|---|
| 10 | 84.7 |
| 16 | 90.5 |

TABLE 9-continued

Membrane Performance

| Membrane Feed $CO_2$ concentration (mol %) | Membrane Permeate $CO_2$ concentration (mol %) |
|---|---|
| 25 | 94.3 |
| 40 | 97.1 |

Figure 6:
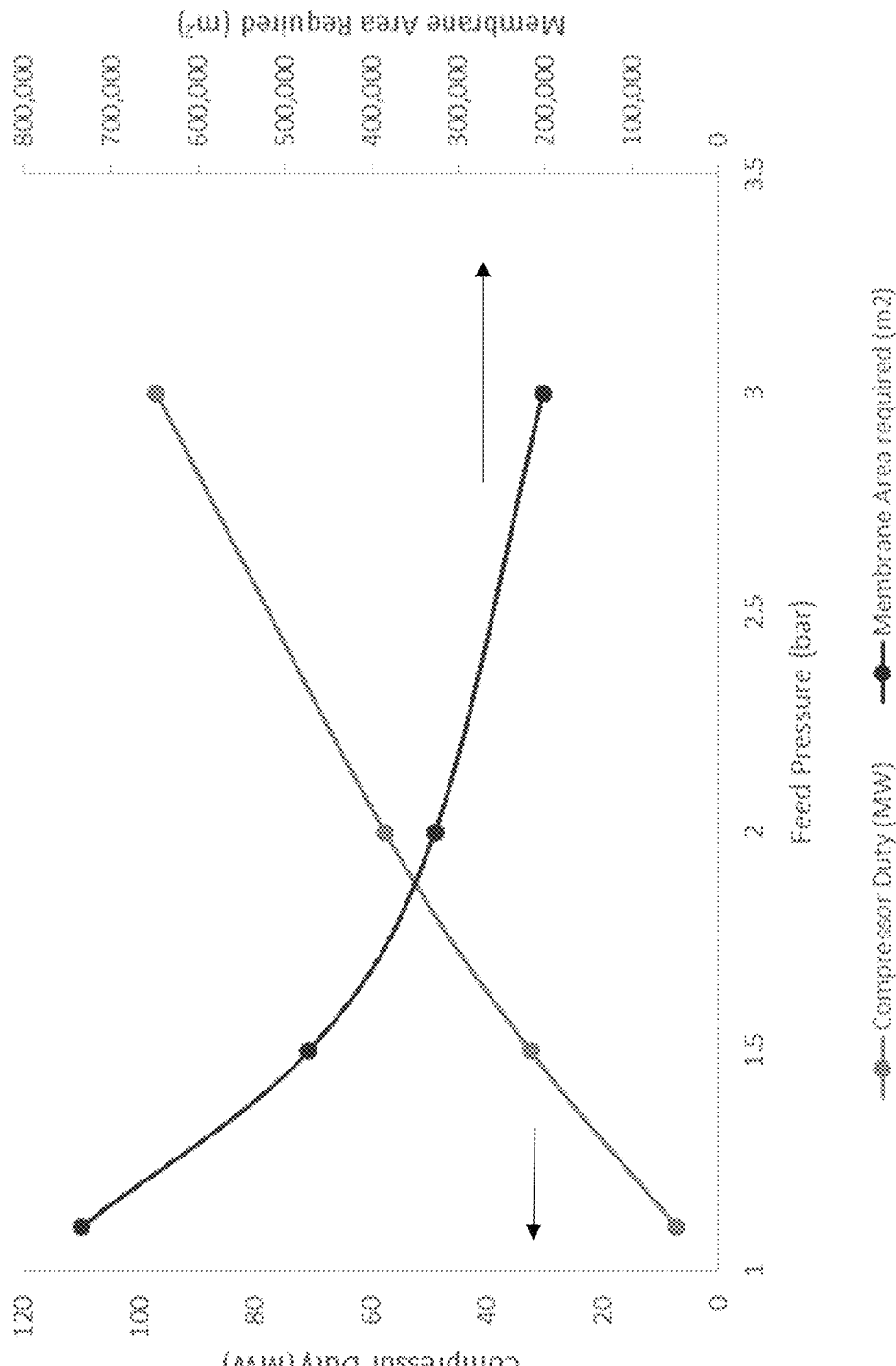
FIG. 6 shows the relationship between membrane size and compressor duty for separating $CO_2$ from a flue gas at a representative set of conditions.

To further illustrate the potential benefits of using a membrane, an NGCC power plant with 354 MW net power and an MEA amine scrubber can be used as the base case. This corresponds to the same base case used in Example 3 above. To allow for a comparative calculation, a membrane can be used for $CO_2$ in an NGCC system that uses oxygen-enhanced combustion and exhaust gas recycle to form a flue gas containing 25 vol % $CO_2$. Based on these assumptions, FIG. 6 shows the impact of feed pressure on maximum membrane area required and feed compressor duty in order to achieve capture of 90 vol % of the $CO_2$ in the flue gas as part of the permeate. (The arrows in FIG. 6 indicate which the relevant vertical axis for each data plot.) As shown in FIG. 6, there is a trade-off between membrane area and compressor duty. It is noted that FIG. 6 shows the maximum membrane area required if all the flue gas from the power plant is sent to the membrane—in reality, lower membrane area will be required. The exact amount of membrane area required is dependent on the amount of exhaust gas recycle. In particular, with selective exhaust gas recycle, substantially lower membrane areas may be sufficient.

Using a membrane can be favorable for reducing or minimizing the amount of energy debit that is incurred in performing $CO_2$ capture. As shown in Example 3, using a combination of oxygen-enriched combustion and exhaust gas recycle can reduce the amount of flue gas for processing by 70% or more relative to a base case with air as the oxygen-containing gas and no exhaust gas recycle. Based on reducing the flue gas flow rate by 70%, the amount of energy required for using a membrane to separate $CO_2$ can be calculated under representative conditions. For example, for a flue gas flow rate that is reduced by 70%, a membrane feed (i.e., flue gas) pressure of 150 kPa-a, a membrane feed temperature of 50° C., and a pressure of 10 kPa-a on the permeate side of the membrane, the energy penalty for performing $CO_2$ separation using a membrane is ~13 MW for the compressor and vacuum pump and 14.4 MW for the flue gas cooler. This is a total energy debit of 27.4 MW compared to 69.9 MW for the base case of using an amine scrubber for capture of $CO_2$ in a system without exhaust gas recycle and using air as the oxygen source. In fact, the energy debit for the membrane is lower than the energy debit from the case in Example 3 where the oxygen-containing gas contains 30 vol % $O_2$ and exhaust gas recycle is used with an amine scrubber (31.1 MW).

Therefore, a 37 MW gas turbine would require about 1000 TPD oxygen enriched feed at 40%, assuming linear scale.

For these four cases, the main power consumption for compressors and pumps was estimated on annual base (assuming operation 300 days/year). Details of performance and energy consumption are summarized in Table 3. It is noted that co-produced $N_2$ having purity over 97% is also formed, and oxygen enriched to 40% from blowdown streams. The cycle was tuned to have high oxygen recovery.

TABLE 3

| Comparison of Vacuum Pressure Swing Processes | | | | | |
|---|---|---|---|---|---|
| | Adsorbent | Case I CMS | Case II | Case III EM | Case IV |
| Separation performance | "Nitrogen purity in adsorption product (%)" | 97.25 | 98.83 | 98.47 | 98.08 |
| | "Oxygen purity in evacuation product (%)" | 39.98 | 41.26 | 42.08 | 42.58 |
| | "Oxygen recovery (%)" | 88.91 | 95.75 | 94.55 | 92.79 |
| | Total nitrogen product flow (ton/day) | 667.74 | 764.39 | 810.50 | 822.81 |
| | Total 40% oxygen product flow (ton/day) | 990.74 | 1126.20 | 1108.50 | 1069.99 |
| Annual power consumption (based on 300 days/year) | "Power all compressors (GJ)" | 108738 | 132808 | 136959 | 136959 |
| | "Power all vacuum pumps (GJ)" | 201308 | 233194 | 120670 | 76806 |
| | "Overall power consumption (GJ)" | 310046 | 366002 | 257628 | 213764 |

The membrane area required is 141,900 m²—even assuming plate-and-frame membranes which have the lowest surface area to volume ratio (but also have the lowest pressure drop), the volume of the membrane unit would be ~2400 m³. Alternatively, spiral-wound membranes would reduce the volume of the membrane unit by an order of magnitude. Based on calculations done previously, a commercial amine scrubber (for example, MHI process) has a productivity of 7.7 kg $CO_2$/h/m³. If OEC and EGR is not performed, the volume requirement of this process would be 15,800 m³, which is 6.6 times the volumetric footprint of a plate-and-frame membrane unit.

Example 5—Additional Performance and Energy Evaluation

To evaluate cost effectiveness on $O_2$ enrichment using vacuum pressure swing adsorption process in Table 2, four cases were simulated for performance, capital, and energy estimation. Case I uses a conventional CMS adsorbent with vacuum of 0.1 bar, while Case II, Case III, and Case IV used zeolite ITQ-55 with vacuum pressures of 0.1 bar, 0.2 bar, and 0.3 bar, respectively. Since the CMS adsorbent cannot provide required performance at low vacuum above 0.1 bar, the CMS only show for one case with 0.1 bar vacuum. ITQ-55 shows good tunability with low vacuum to achieve the required separation performance.

The throughput is set for small scale of NGCC of 100 kTA $CO_2$, which would require about 1000 ton/day 40% oxygen enrichment, feeding to gas turbine. The calculation is based on the representative assumption of a total flue gas flowrate for 727 MW NGCC of 138,406 kmol/hr, with a $CO_2$ concentration of 4.08%. With 90% $CO_2$ capture in 100 kTA base, the NGCC power would be about 37 MW. Based on the calculation in the examples, a 350 MW NGCC would require 10,000 TPD (tons per day) of 40% $O_2$ enriched air.

Additional Embodiments

Embodiment 1. A method for operating a power generation process, comprising: separating air using a pressure swing adsorption process to form a nitrogen-containing stream comprising 95 vol % or more of $N_2$ and an oxygen-containing stream comprising 25 vol % to 48 vol % of $O_2$; combusting a fuel with $O_2$ from at least a portion of the oxygen-containing stream in the presence of a recycle stream in a combustion chamber of a turbine to form a flue gas, the $O_2$ from the at least a portion of the oxygen-containing stream comprising 16 vol % to 35 vol % of a combined volume of i) the fuel, ii) the at least a portion of the oxygen-containing stream, and iii) the recycle stream, the flue gas comprising 12 vol % or more of $CO_2$; forming the recycle stream from one or more portions of the flue gas; and performing post-combustion capture on at least a portion of the flue gas to form a $CO_2$-containing product stream and one or more $CO_2$-depleted flue gas streams, the one or more $CO_2$-depleted flue gas streams comprising 30 vol % or less of the $CO_2$ from the at least a portion of the flue gas.

Embodiment 2. The method of Embodiment 1, wherein the pressure swing adsorption process comprises at least one process step performed at a pressure of 90 kPa-a or less.

Embodiment 3. The method of any of the above embodiments, wherein the oxygen-containing stream comprises 35 vol % or more of $O_2$, or wherein the oxygen-containing stream further comprises 50 vol % or more of $N_2$, or a combination thereof.

Embodiment 4. The method of any of the above embodiments, wherein the pressure swing adsorption process comprises: exposing air to a sorbent comprising kinetic selectivity for $O_2$ relative to $N_2$ in a sorbent environment at a pressure of 200 kPa-a to 800 kPa-a to form an adsorption effluent comprising the nitrogen-containing stream; exhausting a blowdown effluent from the sorbent environment;

purging the sorbent environment with at least a portion of the blowdown effluent to form the oxygen-containing stream; and purging the sorbent environment with a portion of the adsorption effluent, the sorbent having kinetic selectivity for $O_2$ relative to $N_2$ optionally comprising at least one of a carbon molecular sieve and ITQ-55.

Embodiment 5. The method of Embodiment 4, wherein the blowdown effluent is exhausted from the same end of the sorbent environment as the adsorption effluent.

Embodiment 6. The method of Embodiment 4 or 5, wherein the pressure swing adsorption process is performed in a plurality of sorbent environments, the pressure swing adsorption process further comprising equalizing a pressure of a first sorbent environment after exposing air to a first sorbent with a pressure of a second sorbent environment after purging the second sorbent environment with a portion of the adsorption effluent.

Embodiment 7. The method of any of the above embodiments, wherein the recycle stream is mixed with the oxygen-containing stream prior to entering the combustion chamber, or wherein the recycle stream is at a pressure of 90 kPa-a to 115 kPa-a when mixed with the oxygen-containing stream, or a combination thereof.

Embodiment 8. The method of any of the above embodiments, i) wherein the flue gas comprises a $CO_2$ content of 16 vol % or more, ii) wherein the $CO_2$-containing stream comprises 90 vol % or more of $CO_2$, iii) wherein the $CO_2$-containing stream comprises 80 vol % or more of the $CO_2$ from the at least a portion of the flue gas; or iv) a combination of two or more of i), ii) and iii).

Embodiment 9. The method of any of the above embodiments, wherein forming the recycle stream from one or more portions of the flue gas comprises forming the recycle stream from the $CO_2$-containing stream.

Embodiment 10. The method of any of the above embodiments, wherein performing post-combustion capture on the at least a portion of the flue gas comprises separating the at least a portion of the flue gas using a membrane separator, an amine scrubber, a liquid phase sorbent where the liquid is at least partially in the form of liquid droplets or a thin liquid film, or a combination thereof.

Embodiment 11. The method of any of Embodiments 1 to 9, wherein performing post-combustion capture on the at least a portion of the flue gas comprises exposing the at least a portion of the flue gas to a solid sorbent to sorb $CO_2$ on the solid sorbent, and desorbing at least a portion of the sorbed $CO_2$ by direct displacement, a pressure swing, a temperature swing, or a combination thereof.

Embodiment 12. The method of any of Embodiments 1 to 9, wherein performing post-combustion capture on the at least a portion of the flue gas comprises forming a cathode input flow comprising the at least a portion of the flue gas, passing the cathode input flow into the cathode of a molten carbonate fuel cell, and operating the molten carbonate fuel cell to generate electrical power, an anode output flow, and a cathode output flow corresponding to the $CO_2$-depleted stream.

Embodiment 13. The method of any of the above embodiments, wherein the method further comprises passing the at least a portion of the flue gas through a heat recovery steam generator to generate electrical power prior to separating the at least a portion of the flue gas; or wherein the method further comprises adding fuel to the at least a portion of the flue gas; and performing supplemental combustion on the at least a portion of the flue gas prior to performing post-combustion capture on the at least a portion of the flue gas; or a combination thereof.

Embodiment 14. A system for generating power, comprising: a swing adsorption stage comprising a plurality of swing adsorption vessels containing a sorbent having kinetic selectivity for $O_2$ relative to $N_2$, the swing adsorption stage comprising an air inlet, a nitrogen-containing product outlet, and an oxygen-containing product outlet; a turbine comprising a compressor, a combustion chamber, an expander, and a shaft coupling the expander to the compressor, the combustion chamber comprising a combustion outlet and one or more combustion inlets, the one or more combustion inlets being in fluid communication with a fuel source and with the oxygen-containing product outlet; a supplemental combustor comprising a supplemental fuel inlet, a flue gas inlet in fluid communication with the combustion outlet, and a supplemental combustion outlet; a heat recovery steam generator comprising a heat recovery inlet in fluid communication with the supplemental combustion outlet, and a heat recovery outlet; and a post-combustion capture stage comprising a capture inlet in fluid communication with the heat recovery outlet, a $CO_2$-containing product outlet, and one or more $CO_2$-depleted stream outlets, the post-combustion capture stage comprising one or more amine scrubbers, one or more sorbent environments comprising a solid sorbent, one or more sorbent environments comprising a liquid sorbent, or a combination thereof, wherein the one or more combustion inlets are further in fluid communication with at least one of the heat recovery outlet and the $CO_2$-containing product outlet.

Embodiment 15. A system for generating power, comprising: a swing adsorption stage comprising a plurality of swing adsorption vessels containing a sorbent having kinetic selectivity for $O_2$ relative to $N_2$, the swing adsorption stage comprising an air inlet, a nitrogen-containing product outlet, and an oxygen-containing product outlet; a turbine comprising a compressor, a combustion chamber, an expander, and a shaft coupling the expander to the compressor, the combustion chamber comprising a combustion outlet and one or more combustion inlets, the one or more combustion inlets being in fluid communication with a fuel source and with the oxygen-containing product outlet; a heat recovery steam generator comprising a heat recovery inlet in fluid communication with the combustion outlet, and a heat recovery outlet; and a post-combustion capture stage comprising a capture inlet in fluid communication with the heat recovery outlet, a $CO_2$-containing product outlet, and one or more $CO_2$-depleted stream outlets, the post-combustion capture stage comprising one or more membrane separators, one or more molten carbonate fuel cells, or a combination thereof, wherein the one or more combustion inlets are further in fluid communication with at least one of the heat recovery outlet and the $CO_2$-containing product outlet.

Additional Embodiment A. The method of any of Embodiments 1-13, wherein the separating air using a pressure swing adsorption process comprises a kinetic separation process.

Additional Embodiment B. The method of any of Embodiments 1-13, wherein the fuel comprises natural gas.

Additional Embodiment C. The method of any of Embodiments 1-13, wherein the turbine comprises a compressor, the combustion chamber, an expander, and shaft coupling the expander to the compressor While the present invention has been described and illustrated by reference to particular embodiments, those of ordinary skill in the art will appreciate that the invention lends itself to variations not necessarily illustrated herein.

For this reason, then, reference should be made solely to the appended claims for purposes of determining the true scope of the present invention.

The invention claimed is:

1. A method for operating a power generation process, comprising:

separating air using a pressure swing adsorption process to form a nitrogen-containing stream comprising 95 vol % or more of $N_2$ and an oxygen-containing stream comprising 25 vol % to 48 vol % of $O_2$;

combusting a fuel with $O_2$ from at least a portion of the oxygen-containing stream in the presence of a recycle stream in a combustion chamber of a turbine to form a flue gas, the $O_2$ from the at least a portion of the oxygen-containing stream comprising 16 vol % to 35 vol % of a combined volume of i) the fuel, ii) the at least a portion of the oxygen-containing stream, and iii) the recycle stream, the flue gas comprising 12 vol % or more of $CO_2$;

forming the recycle stream from one or more first portions of the flue gas; and performing post-combustion capture on at least a second portion of the flue gas to form a $CO_2$-containing product stream and one or more $CO_2$-depleted flue gas streams, the one or more $CO_2$-depleted flue gas streams comprising 30 vol % or less of the $CO_2$ from the at least a second portion of the flue gas, wherein the pressure swing adsorption process comprises:

exposing air to a sorbent having kinetic selectivity for $O_2$ relative to $N_2$ in a sorbent environment at a pressure of 200 kPa-a to 800 kPa-a to form an adsorption effluent comprising the nitrogen-containing stream;

exhausting a blowdown effluent from the sorbent environment;

purging the sorbent environment with at least a portion of the blowdown effluent to form the oxygen-containing stream; and purging the sorbent environment with a portion of the adsorption effluent.

2. The method of claim 1, wherein the oxygen-containing stream further comprises 50 vol % or more of $N_2$.

3. The method of claim 1, wherein the sorbent having kinetic selectivity for $O_2$ relative to $N_2$ comprises at least one of a carbon molecular sieve and ITQ-55.

4. The method of claim 1, wherein the blowdown effluent is exhausted from the same end of the sorbent environment as the adsorption effluent.

5. The method of claim 1, wherein the pressure swing adsorption process is performed in a plurality of sorbent environments, the pressure swing adsorption process further comprising equalizing a pressure of a first sorbent environment after exposing air to a first sorbent with a pressure of a second sorbent environment after purging the second sorbent environment with a portion of the adsorption effluent.

6. The method of claim 1, wherein the recycle stream is mixed with the oxygen-containing stream prior to entering the combustion chamber.

7. The method of claim 6, wherein the recycle stream is at a pressure of 90 kPa-a to 115 kPa-a when mixed with the oxygen-containing stream.

8. The method of claim 1, wherein the flue gas comprises a $CO_2$ content of 16 vol % or more.

9. The method of claim 1, wherein the $CO_2$-containing product stream comprises 80 vol % or more of $CO_2$.

10. The method of claim 1, wherein forming the recycle stream from one or more first portions of the flue gas comprises forming the recycle stream from the $CO_2$-containing product stream.

11. The method of claim 1, wherein performing post-combustion capture on the at least a second portion of the flue gas comprises separating the at least a second portion of the flue gas using a membrane separator, an amine scrubber, a liquid phase sorbent where the liquid is at least partially in the form of liquid droplets or a thin liquid film, or a combination thereof.

12. The method of claim 1, wherein performing post-combustion capture on the at least a second portion of the flue gas comprises exposing the at least a second portion of the flue gas to a solid sorbent to sorb $CO_2$ on the solid sorbent, and desorbing at least a portion of the sorbed $CO_2$ by direct displacement, a pressure swing, a temperature swing, or a combination thereof.

13. The method of claim 1, wherein performing post-combustion capture on the at least a second portion of the flue gas comprises forming a cathode input flow comprising the at least a second portion of the flue gas, passing the cathode input flow into a cathode of a molten carbonate fuel cell, and operating the molten carbonate fuel cell to generate electrical power, an anode output flow, and a cathode output flow corresponding to the $CO_2$-depleted stream.

14. The method of claim 1, wherein the oxygen-containing stream comprises 35 vol % or more of $O_2$.

15. The method of claim 1, further comprising passing the at least a second portion of the flue gas through a heat recovery steam generator to generate electrical power prior to performing post-combustion capture on the at least a second portion of the flue gas.

16. The method of claim 1, further comprising adding fuel to the at least a second portion of the flue gas; and performing supplemental combustion on the at least a second portion of the flue gas prior to performing post-combustion capture on the at least a portion of the flue gas.

17. The method of claim 1, wherein the separating air using a pressure swing adsorption process comprises a kinetic separation process.

18. The method of claim 1, wherein the fuel comprises natural gas.

19. The method of claim 1, wherein the $CO_2$-containing product stream comprises 80 vol % or more of the $CO_2$ from the at least a second portion of the flue gas.

20. The method of claim 1, wherein the turbine comprises a compressor, the combustion chamber, an expander, and shaft coupling the expander to the compressor.

* * * * *